(12) United States Patent
Oshiba

(10) Patent No.: US 9,531,615 B2
(45) Date of Patent: Dec. 27, 2016

(54) AVAILABLE BANDWIDTH ESTIMATING SYSTEM, METHOD, AND PROGRAM

(71) Applicant: NEC Corporation, Minato-ku, Tokyo (JP)

(72) Inventor: Takashi Oshiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 14 days.

(21) Appl. No.: 14/416,758

(22) PCT Filed: Apr. 4, 2013

(86) PCT No.: PCT/JP2013/062616
§ 371 (c)(1),
(2) Date: Jan. 23, 2015

(87) PCT Pub. No.: WO2014/017140
PCT Pub. Date: Jan. 30, 2014

(65) Prior Publication Data
US 2015/0180757 A1 Jun. 25, 2015

(30) Foreign Application Priority Data
Jul. 27, 2012 (JP) .................................. 2012-166897

(51) Int. Cl.
*H04L 12/26* (2006.01)
*H04L 12/805* (2013.01)
(Continued)

(52) U.S. Cl.
CPC ......... *H04L 43/0882* (2013.01); *H04L 41/147* (2013.01); *H04L 43/0852* (2013.01);
(Continued)

(58) Field of Classification Search
CPC ...... H04L 43/02; H04L 43/04; H04L 43/0805; H04L 43/0882; H04L 43/0888; H04L 43/10
See application file for complete search history.

(56) References Cited

U.S. PATENT DOCUMENTS 5,477,531 A 12/1995 McKee et al.
7,180,858 B1 2/2007 Roy et al.
(Continued)

FOREIGN PATENT DOCUMENTS

CN 101026509 A 8/2007
GB 2466208 A 6/2010
(Continued)

OTHER PUBLICATIONS

International Search Report for PCT Application No. PCT/JP2013/062616, mailed on Jul. 9, 2013.
(Continued)

*Primary Examiner* — Ian N Moore
*Assistant Examiner* — Latresa McCallum
(74) *Attorney, Agent, or Firm* — Sughrue Mion, PLLC

(57) ABSTRACT

The available bandwidth estimating system is provided with a transmitting device and a receiving device, and estimates available bandwidth for a network that connects the transmitting device and the receiving device. The transmitting device is provided with a packet transmission means that transmits a packet train, comprising a given number of packets with packet sizes which are incremented by a certain increment, so that each packet is at even intervals. The receiving device is equipped with a receiving means that receives the packet train from the packet transmission means and calculates the cumulative queuing delay for the packets included in the packet train, and an available bandwidth calculating means that calculates an estimated value for available bandwidth by detecting a point of variation in the overall change of the cumulative queuing delay.

9 Claims, 11 Drawing Sheets

(51) Int. Cl.
  *H04L 12/24* (2006.01)
  *H04W 28/02* (2009.01)
  *H04L 12/911* (2013.01)

(52) U.S. Cl.
  CPC .......... *H04L 47/365* (2013.01); *H04L 47/822* (2013.01); *H04W 28/0236* (2013.01)

(56) References Cited

U.S. PATENT DOCUMENTS

2006/0215574 A1* 9/2006 Padmanabhan ..... H04L 12/2697 370/252
2009/0164657 A1* 6/2009 Li ....................... H04L 41/0896 709/233

FOREIGN PATENT DOCUMENTS

| | | |
|---|---|---|
| JP | 2004-254025 A | 9/2004 |
| JP | 2008-258877 A | 10/2008 |
| JP | 2011-515978 A | 5/2011 |
| JP | 2011-142622 A | 7/2011 |
| JP | 2011142622 A | 7/2011 |
| WO | 2011/132783 A1 | 10/2011 |

OTHER PUBLICATIONS

The extended European Search Report of EP Application No. 13822986.9 dated on Feb. 29, 2016.
Korean Office Action for KR Application No. 2015-7002181 issued on Sep. 23, 2015 with English Translation.
Japanese Office Action for JP Application No. 2014-526789 mailed on Oct. 4, 2016 with English Translation.

* cited by examiner

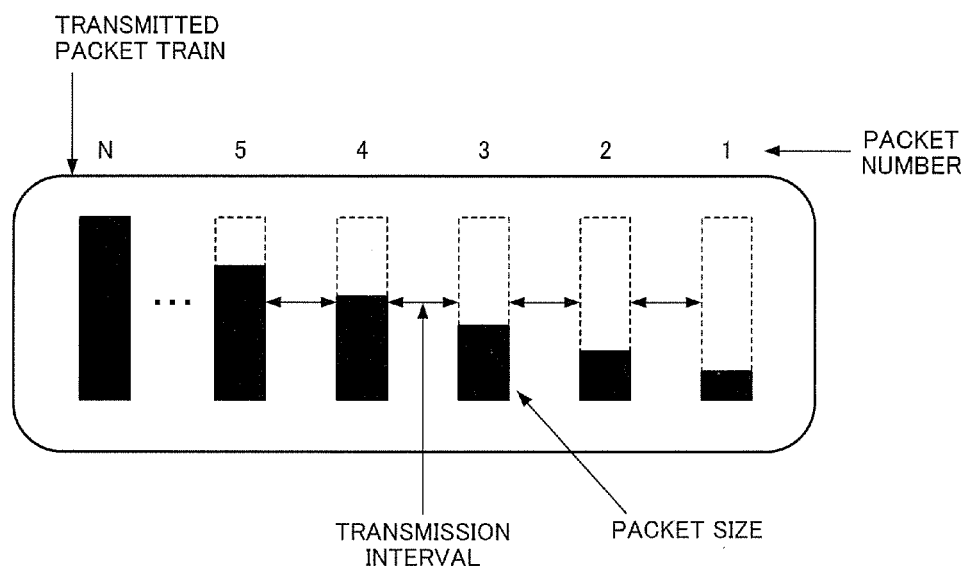
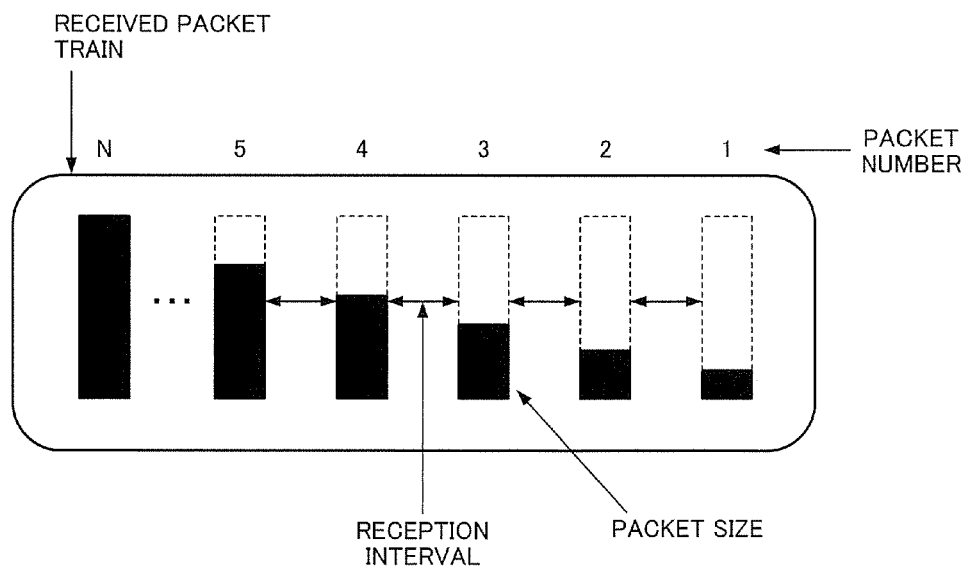

DATA STRUCTURE

DATA STRUCTURE

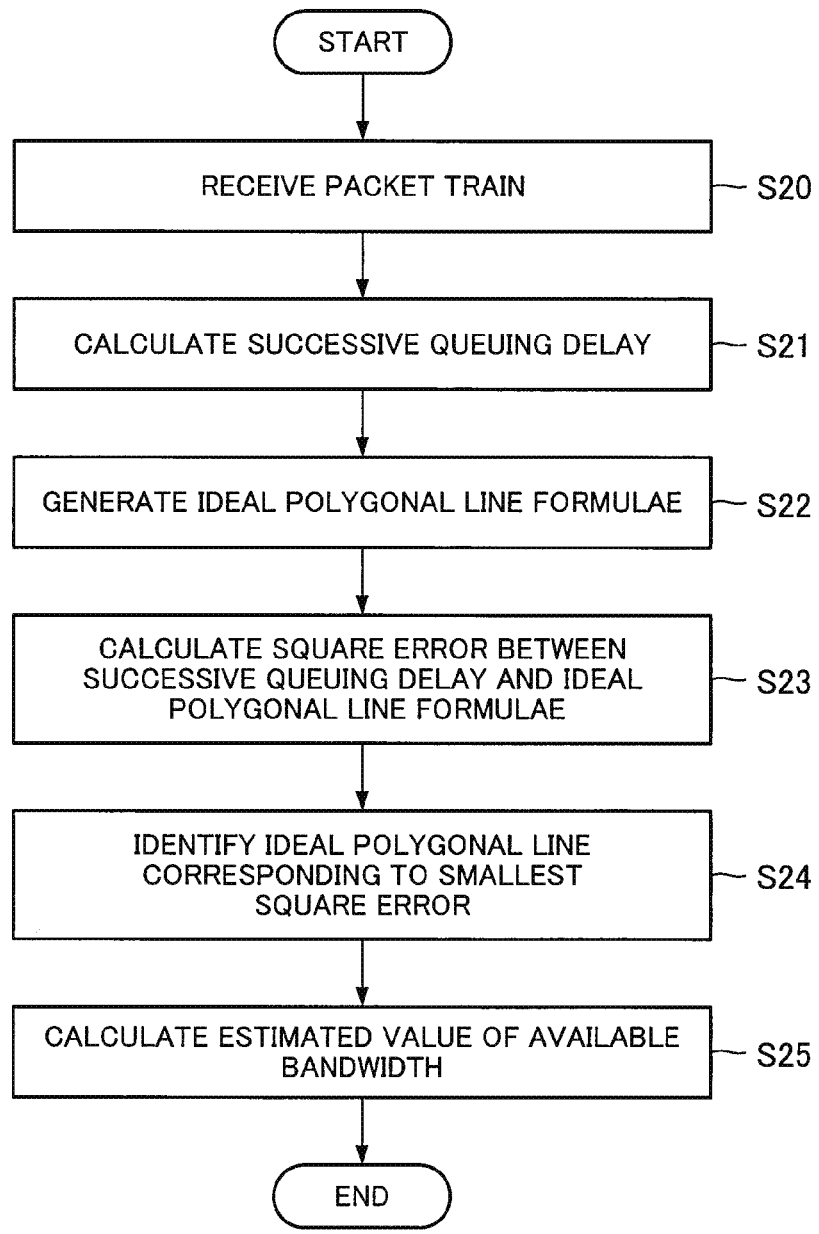

ary Entry of PCT/JP2013/
AVAILABLE BANDWIDTH ESTIMATING SYSTEM, METHOD, AND PROGRAM This application is a National Stage Entry of PCT/JP2013/062616 filed on Apr. 30, 2013, which claims priority from Japanese Patent Application 2012-166897 filed on Jul. 27, 2012, the contents of all of which are incorporated herein by reference, in their entirety.

TECHNICAL FIELD

The present invention relates to a system, a method, and a program for estimating an available bandwidth that is a vacant bandwidth in a communication line.

BACKGROUND ART

A bandwidth that is a usable band in a communication line (hereinafter, also referred to as an "available bandwidth") is a vacant bandwidth obtained by subtracting other traffic that is flowing in a network (hereinafter, referred to as "cross traffic") from the bottle-neck physical bandwidth of a communication line. For example, in a case where the bottle-neck physical bandwidth is 100 Mbps and the cross traffic is 30 Mbps in the communication line, the available bandwidth is 100−30=70 Mbps.

Currently, estimation of the available bandwidth has been an important factor for video chat, videophone, TV conference, and the like involving communications between terminals in both directions to transmit images. The estimation is important because the estimation can ensure image quality. Specifically, by keeping an image transmission rate at an estimated value of the available bandwidth or lower, the sum of the image transmission rate and the cross traffic can be prevented from exceeding the bottleneck-link physical bandwidth, whereby a packet loss can be prevented.

For example, PTL 1 describes a related technique for estimating the available bandwidth. In PTL 1, as illustrated in FIG. 1 A, a transmitting device transmits a set of packets (hereinafter, referred to as a "packet train") for estimating an available bandwidth to a receiving device. In the packet train, the packets are at regular intervals, and the packet size gradually increases. The receiving device detects a change in a reception interval of each packet, whereby the available bandwidth is estimated. With this transmission method, the packet transmission rate linearly increases in the packet train. When the packet transmission rate exceeds the available bandwidth of a network while the packet train is passing through the network, packets are temporarily queued in a device such as a router or a switch on the network (the delay caused by the queuing is hereinafter referred to as "queuing delay"). Thus, as illustrated in FIG. 1 B, the packet reception interval in the receiving device increases relative to the transmission interval in the transmitting device. This mechanism is used to calculate the available bandwidth. Specifically, a point where the packet reception interval in the receiving device starts to increase relative to the transmission interval in the transmitting device is detected, and the packet size corresponding to that point is divided by the transmission interval.

In PTL 1, the reception interval is directly used to calculate the available bandwidth. Alternatively, the queuing delay may be calculated from a packet transmission/reception time, and a point where the queuing delay rises to a positive value from 0 may be detected to achieve the estimation of the available bandwidth equivalent to that in PTL 1.

There are two types of queuing delay: cumulative queuing delay and successive queuing delay. As illustrated in FIG. 2, the cumulative queuing delay of the j-th (j=2, 3, . . . , N) packet is obtained as $$Qc(j)=\{tr(j)-tr(1)\}-\{ts(j)-ts(1)\}$$

where ts(i) represents the transmission time of the i-th (i=1, 2, . . . , N) packet in the transmitting device, and tr(i) represents the reception time of the i-th packet in the receiving device. More specifically, Qc(j) is a value obtained by subtracting elapsed time 14 between the transmission time of first packet to the to that of the j-th packet in the transmitting device, from elapsed time 12 between the reception time of the first packet and that of the j-th packet in the receiving device. The successive queuing delay will be defined later.

CITATION LIST

Patent Literature

[PTL 1]: Japanese Patent Application Laid-open No. 2011-142622

SUMMARY OF INVENTION

Technical Problem

The related technique has a problem in that the estimation accuracy for the available bandwidth degrades in a network involving noise such as change in cross traffic while transmission of a packet train is in process, change in a field intensity in a wireless network such as a wireless LAN or a mobile phone network, or packet transmission/reception timing disorder attributable to scheduling in a base station.

This is because the microscopic analysis to check the reception interval or the cumulative queuing delay for each packet in the related technique is susceptible to the noise. Specifically, PTL 1 describes the method of detecting the point where the packet reception interval starts to increase relative to the transmission interval in the transmitting device, and the method of detecting the point where the queuing delay rises to a positive value from 0. These methods result in underestimation when the noise described above occurs. Specifically, as illustrated in FIG. 3, the available bandwidth is calculated by dividing the transmission interval by the packet size at a point where the increased amount of the reception interval relative to the transmission interval or the cumulative queuing delay temporarily rises to a positive value to eventually return to 0 due to the noise. Accordingly, the estimated value of the available bandwidth thus obtained is smaller than a true value.

OBJECT OF THE INVENTION

An object of the present invention is to improve estimation accuracy for an available bandwidth in a network involving noise such as change in cross traffic while transmission of a packet train is in process, change in a field intensity in a wireless network such as a wireless LAN or a mobile phone network, or packet transmission/reception timing disorder attributable to scheduling in a base station.

Solution to Problem

An available bandwidth estimating system according to the present invention is an available bandwidth estimating system including: a transmitting device and a receiving device. The available bandwidth estimating system estimates an available bandwidth of a network connecting between the transmitting device and the receiving device. The transmitting device includes a packet transmission means for transmitting a packet train including a predetermined number of packets with packet sizes incremented by a predetermined increment, in such a manner that the packets are transmitted at regular intervals. The receiving device includes: a packet reception means for receiving the packet train from the packet transmission means, and calculating cumulative queuing delays of the packets in the packet train; and an available bandwidth calculation means for calculating an estimated value of the available bandwidth by detecting a macroscopic change point of an increase-decrease rate of the cumulative queuing delays.

Another available bandwidth estimating system according to the present invention is an available bandwidth estimating system including a transmitting device and a receiving device. The available bandwidth estimating system estimates an available bandwidth of a network connecting between the transmitting device and the receiving device. The transmitting device includes a packet transmission means for transmitting a packet train including a predetermined number of packets with packet sizes incremented by a predetermined increment, in such a manner that the packets are transmitted at regular intervals. The receiving device includes: a packet reception means for receiving the packet train from the packet transmission means, and calculating successive queuing delays of the packets in the packet train; and an available bandwidth calculation means for calculating an estimated value of the available bandwidth by detecting a macroscopic change point of an increase-decrease rate of the successive queuing delays.

A receiving device according to the present invention is a receiving device including: a packet reception means for receiving a packet train including a predetermined number of packets with packet sizes incremented by a predetermined increment and transmitted in such a manner that the packets are transmitted at regular intervals, and calculating a cumulative queuing delays of the packets in the packet train; an entire section increase-decrease rate calculation means for calculating the increase-decrease rate of the cumulative queuing delays calculated by the packet reception means in an entire section of the packet train received by the packet reception means; a partial section increase-decrease rate calculation means for calculating the increase-decrease rate of the cumulative queuing delays calculated by the packet reception means in a partial section of the packet train received by the packet reception means; an increase-decrease rate comparison means for comparing a ratio of a value of the increase-decrease rate in the partial section calculated by the partial section increase-decrease rate calculation means to a value of the increase-decrease rate in the entire section calculated by the entire section increase-decrease rate calculation means with a predetermined threshold; and an available bandwidth estimated value calculation means for calculating the estimated value of the available bandwidth when a result of the comparison performed by the increase-decrease rate comparison means indicates that the ratio is equal to or higher than the threshold.

An available bandwidth estimating method is an available bandwidth estimating method for estimating an available bandwidth of a network connecting between a transmitting device and a receiving device. The available bandwidth estimating method includes: a packet transmission step of transmitting a packet train including a predetermined number of packets with packet sizes incremented by a predetermined increment, in such a manner that the packets are transmitted at regular intervals from the transmitting device; a packet reception step of receiving the packet train transmitted in the packet transmission step by the receiving device, and calculating cumulative queuing delays of the packets in the packet train; an entire section increase-decrease rate calculation step of calculating the increase-decrease rate of the cumulative queuing delays calculated in the packet reception step in an entire section of the packet train received in the packet reception step; a partial section increase-decrease rate calculation step of calculating the increase-decrease rate of the cumulative queuing delays calculated in the packet reception step in a partial section of the packet train received in the packet reception step; an increase-decrease rate comparison step of comparing a ratio of a value of the increase-decrease rate in the partial section calculated in the partial section increase-decrease rate calculation step to a value of the increase-decrease rate in the entire section calculated in the entire section increase-decrease rate calculation step with a predetermined threshold; and an available bandwidth calculation step of calculating the estimated value of the available bandwidth when a result of the comparison performed in the increase-decrease rate comparison step indicates that the ratio is equal to or higher than the threshold.

An available bandwidth estimating program according to the present invention is an available bandwidth estimating program for estimating an available bandwidth of a network connecting between a transmitting device and a receiving device. The available bandwidth estimating program causing a computer to achieve: a packet transmission function of transmitting a packet train including a predetermined number of packets with packet sizes incremented by a predetermined increment, in such a manner that the packets are transmitted at regular intervals from the transmitting device; a packet reception function of receiving the packet train transmitted by the packet transmission function by the receiving device, and calculating cumulative queuing delays of the packets in the packet train; an entire section increase-decrease rate calculation function of calculating the increase-decrease rate of the cumulative queuing delays calculated by the packet reception function in an entire section of the packet train received by the packet reception function; a partial section increase-decrease rate calculation function of calculating the increase-decrease rate of the cumulative queuing delay calculated by the packet reception function in a partial section of the packet train received by the packet reception function; an increase-decrease rate comparison function of comparing a ratio of a value of the increase-decrease rate in the partial section calculated by the partial section increase-decrease rate calculation function to a value of the increase-decrease rate in the entire section calculated by the entire section increase-decrease rate calculation function with a predetermined threshold; and an available bandwidth calculation function of calculating the estimated value of the available bandwidth when a result of the comparison performed by the increase-decrease rate comparison function indicates that the ratio is equal to or higher than the threshold.

Advantageous Effects of Invention

The prevent invention provides an effect of improving estimation accuracy for an available bandwidth in a network involving noise.

BRIEF DESCRIPTION OF DRAWINGS

FIG. 1 is a diagram illustrating a related technique.
FIG. 11 is a flowchart showing processing in the second exemplary embodiment of the present invention.

DESCRIPTION OF EMBODIMENTS

Exemplary embodiments of the present invention are described below with reference to the accompanying drawings.

(First Exemplary Embodiment)
[Description of Configuration]

Figure 4:
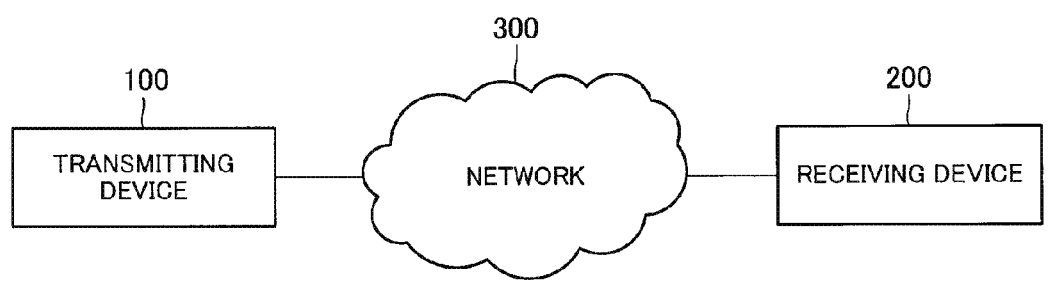
FIG. 4 is a diagram illustrating a network configuration of the present invention.

FIG. 4 is a diagram illustrating a network configuration in a first exemplary embodiment of the present invention. In the figure, a transmitting device 100 and a receiving device 200 are connected to a network 300.

The transmitting device 100 and the receiving device 200 may each be a device that is provided with functions for exchanging information with the outside such as a personal computer (PC), a portable computer (PDA), a mobile phone, a smartphone, a tablet terminal, a fixed landline telephone, a street multimedia terminal, an in-vehicle terminal, a television with a function for connecting to a network, a set-up box with a function for connecting to a network, a game console, a printer with a function for connecting to a network, or a scanner with a function for connecting to a network.

The unillustrated apparatuses, other than the transmitting device 100 and the receiving device 200, may be connected to the network 300, and cross traffic may flow between the unillustrated devices.

Figure 5:
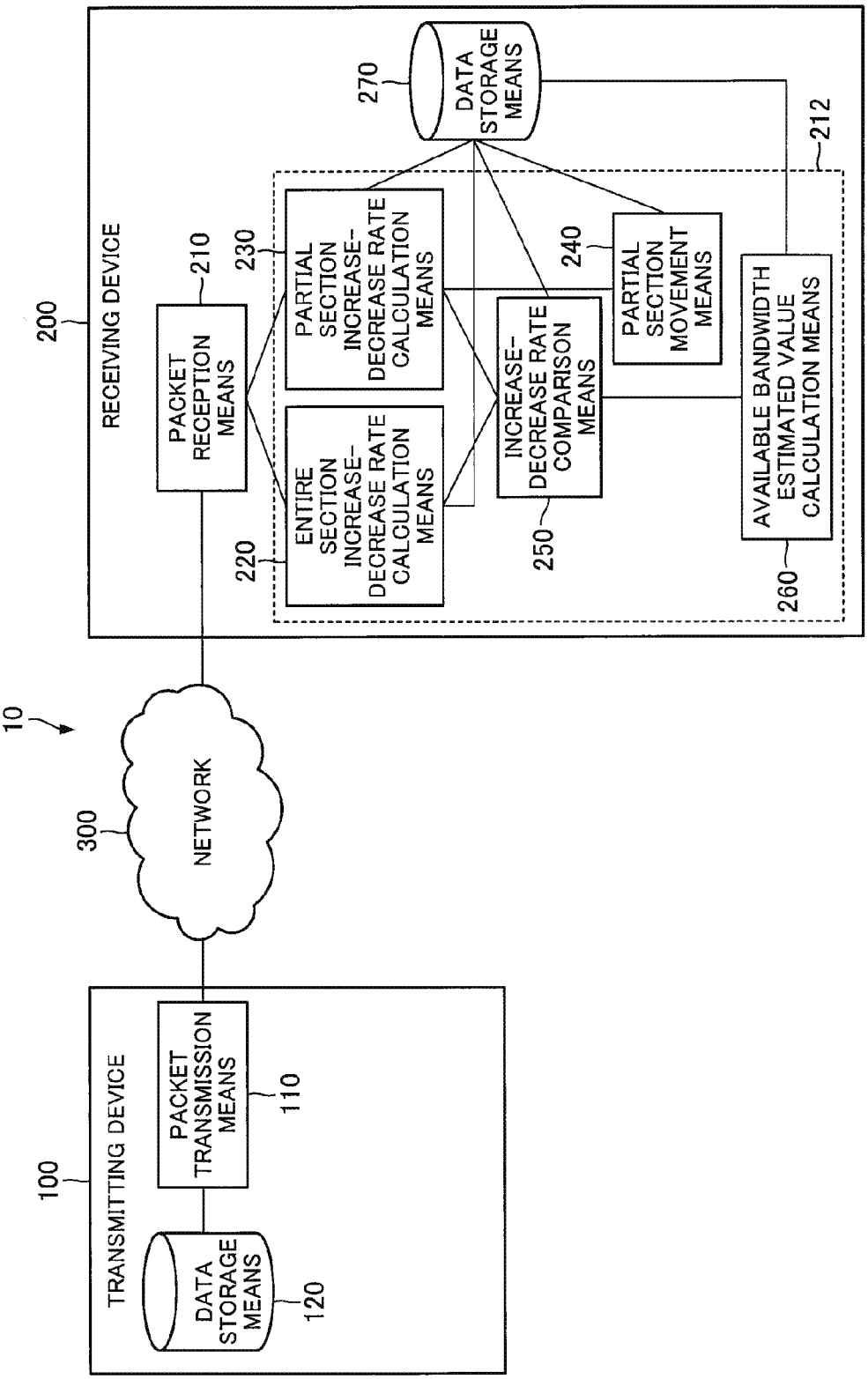
FIG. 5 is a block diagram illustrating a configuration in a first exemplary embodiment of the present invention.
Figure 6:
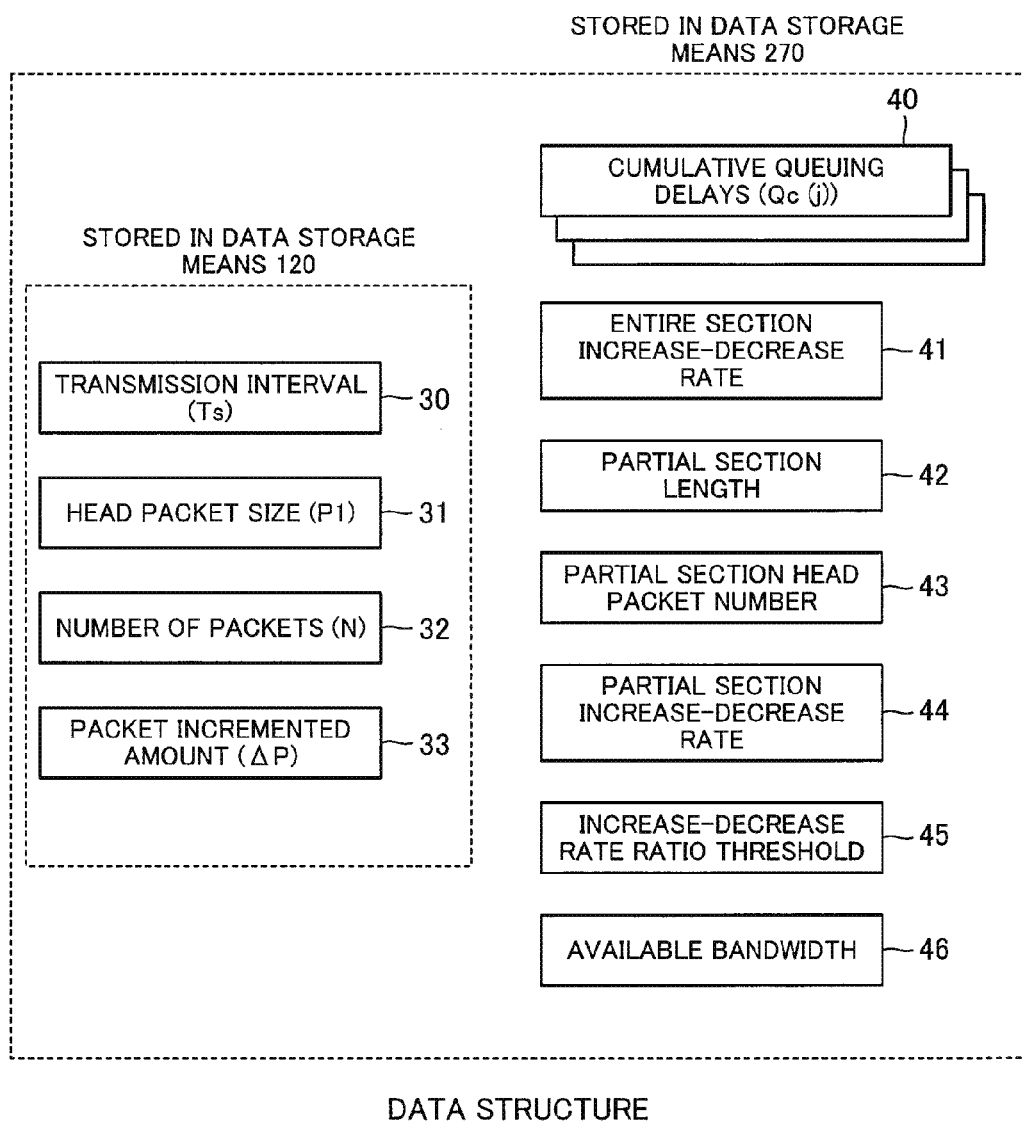
FIG. 6 is a diagram illustrating a data structure in the first exemplary embodiment of the present invention.

FIG. 5 is a block diagram illustrating a configuration in the first exemplary embodiment of the present invention. FIG. 6 illustrates a data structure. The description is given below with reference to these figures.

As illustrated in FIG. 5, the transmitting device 100 includes a packet transmission means 110 and a data storage means 120. The packet transmission means 110 transmits a packet train as illustrated in FIG. 1 A to a packet reception means 210 through the network 300. As illustrated in FIG. 6, the data storage means 120 stores a transmission interval 30, a head packet size 31, the number of packets 32, a packet incremented amount 33.

The transmission interval 30 indicates a transmission interval (denoted with Ts) between packets in the transmitted packet train. The head packet size 31 indicates the packet size (denoted with P1) of the head packet in the transmitted packet train. The number of packets 32 indicates the number of packets (denoted with N) in the transmitted packet train. The packet incremented amount 33 indicates the packet size (denoted with $\Delta P$) incremented each time the packet number in the transmitted packet train is incremented by one. Specifically, the packet size of the i-th (i=1, 2, ..., N) packet is $P1+(i-1)*\Delta P$.

As illustrated in FIG. 5, the receiving device 200 includes the packet reception means 210, an entire section increase-decrease rate calculation means 220, a partial section increase-decrease rate calculation means 230, a partial section movement means 240, an increase-decrease rate comparison means 250, an available bandwidth estimated value calculation means 260, and a data storage means 270. An available bandwidth estimation means 212 may include the packet reception means 210, the entire section increase-decrease rate calculation means 220, the partial section increase-decrease rate calculation means 230, the partial section movement means 240, the increase-decrease rate comparison means 250, and the available bandwidth estimated value calculation means 260.

Figure 8:
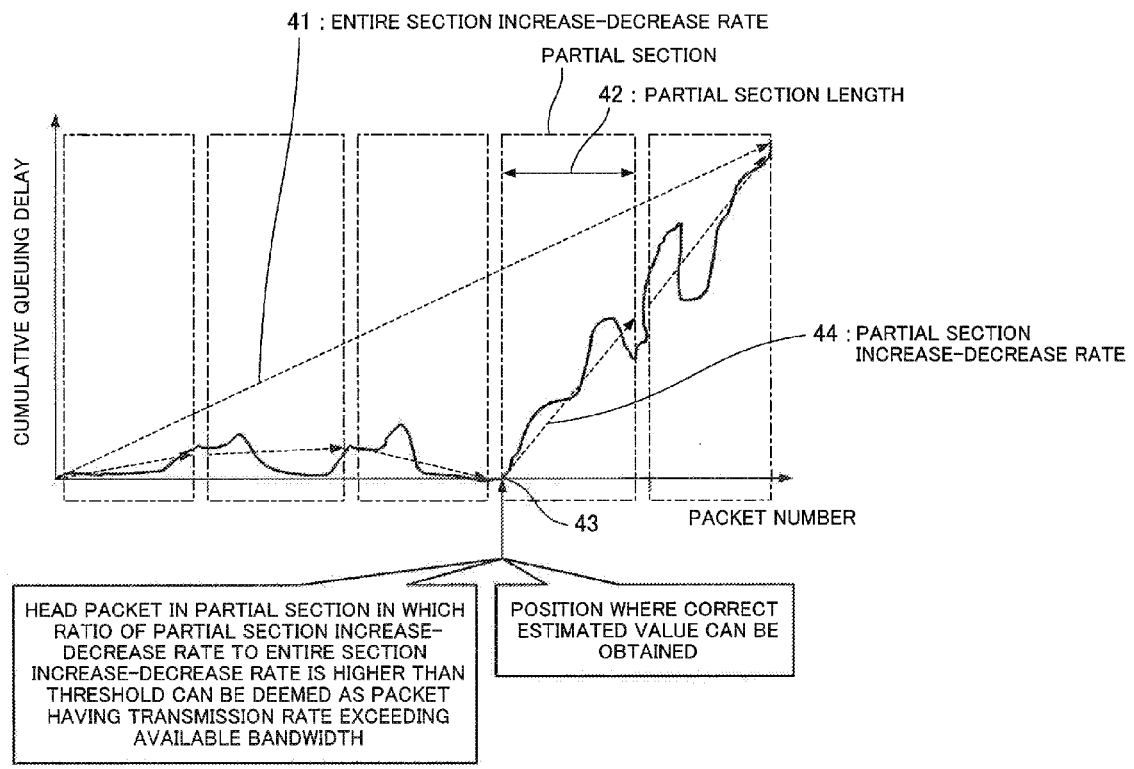
FIG. 8 is a diagram illustrating a principle in the first exemplary embodiment of the present invention.

The packet reception means 210 receives a packet train transmitted from the packet transmission means 110 through the network 300. The entire section increase-decrease rate calculation means 220 calculates an increase-decrease rate of a cumulative queuing delay in the entire section of the packet train. For example, as illustrated in FIG. 8, the entire section increase-decrease rate calculation means 220 may calculate as the increase-decrease rate, a slope of the entire packet train, in a function graph of the cumulative queuing delay 40 with the packet number as an argument. A specific method for calculating the increase-decrease rate is described later.

The partial section increase-decrease rate calculation means 230 calculates the increase-decrease rate of a cumulative queuing delay in a partial section of a packet train. For example, the partial section increase-decrease rate calculation means 230 may calculate a slope of the partial section in the function graph in FIG. 8, as the increase-decrease rate. A specific method for calculating the increase-decrease rate is described later. The partial section movement means 240 moves the partial section in the function graph in FIG. 8. A specific method for moving the partial section is described later.

The increase-decrease rate comparison means 250 compares a value of an entire section increase-decrease rate 41 with a value of a partial section increase-decrease rate 44. The available bandwidth estimated value calculation means 260 calculates an available bandwidth 46. The data storage means 270 stores, as illustrated in FIG. 6, a plurality of cumulative queuing delays 40, the entire section increase-decrease rate 41, a partial section length 42, a partial section head packet number 43, the partial section increase-decrease rate 44, an increase-decrease rate ratio threshold 45, and the available bandwidth 46. The data storage means 270 may store information that is at least partially the same as the transmission interval 30, the head packet size 31, the number of packets 32, and the packet incremented amount 33 stored in the data storage means 120.

Figure 2:
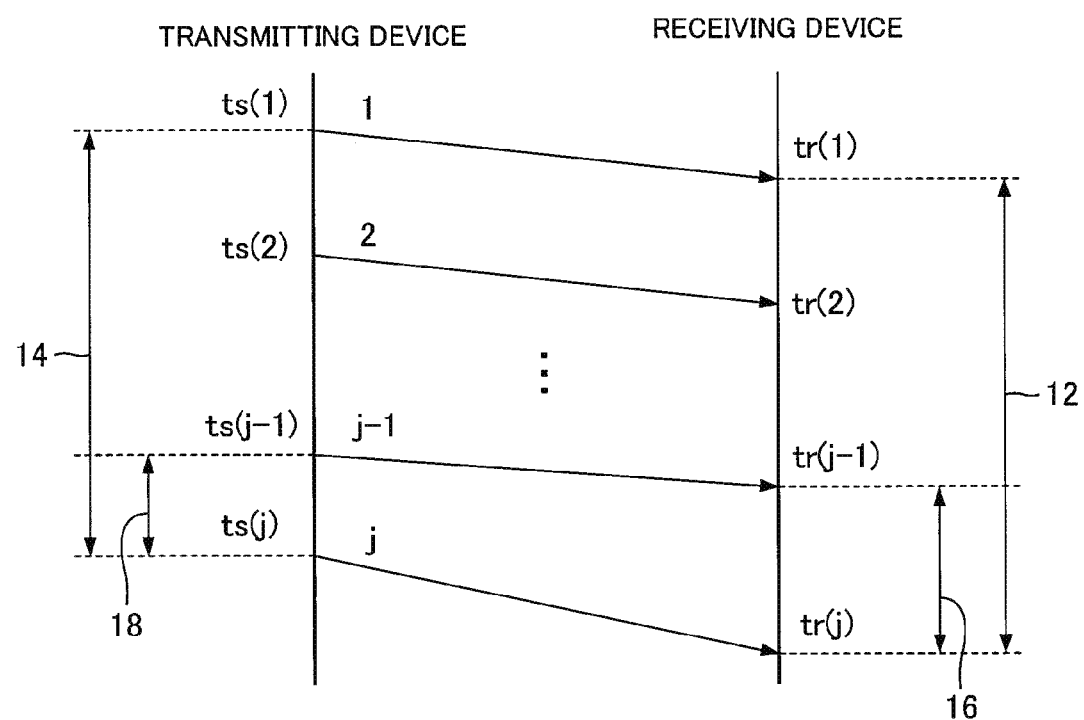
FIG. 2 is a diagram illustrating the related technique.

Each of the cumulative queuing delays 40 are cumulative queuing delays of the respective packets in the received packet train. As illustrated in FIG. 2, the cumulative queuing delay of the j-th (j=2, 3, ..., N) packet is obtained as $Qc(j)=\{tr(j)-tr(1)\}-\{ts(j)-ts(1)\}$, where $ts(i)$ represents the transmission time of the i-th packet of the transmitting device and $tr(i)$ represents the reception time of the i-th packet of the receiving device. Thus, the cumulative queuing delay is in the form of a function with the packet number as an argument. A single packet train has (N−1) cumulative queuing delays 40.

The entire section increase-decrease rate 41 is an increase-decrease rate of the cumulative queuing delays in the entire section of the packet train, and may be represented by the slope of the entire packet train in the function graph in FIG. 8, for example. In FIG. 8, the horizontal axis represents the packet numbers allocated to the packets in the packet train in the transmitted order, and the vertical axis represents a cumulative queuing delay calculated for each packet. In FIG. 8, the entire section of the packet train is divided into five partial sections. The partial section length 42 is the length of each partial section in the function graph in FIG. 8. The partial section length 42 falls within the range of 1 to (N−1) inclusive, and the value of the length is determined by a user of an available bandwidth estimating system 10, for example. The partial section head packet number 43 is the packet number of the head packet in each partial section in the function graph in FIG. 8.

The partial section increase-decrease rate 44 is an increase-decrease rate of the cumulative queuing delays in the partial sections in the packet train, and may be represented by the slope of each partial section in the function graph in FIG. 8, for example. The increase-decrease rate ratio threshold 45 is a threshold for a ratio of the partial section increase-decrease rate 44 to the entire section increase-decrease rate 41, and the value of the threshold is determined by a user of the available bandwidth estimating system 10, for example. The available bandwidth 46 is an estimated value of the available bandwidth calculated by the available bandwidth estimating system 10.

[Description of Processing]

With reference to the flowchart in FIG. 7, processing in the first exemplary embodiment will be described.

(Step S10)

First, the packet transmission means 110 in the transmitting device 100 transmits a packet train to the packet reception means 210 in the receiving device 200. The transmitted packet train has the structure illustrated in FIG. 1 A. The packets are transmitted regularly at the transmission interval 30. The packet size of the head packet is the head packet size 31, and the number of packets is the number of packets 32. The packet size incremented each time the packet number is incremented by one is the packet incremented amount 33. The packet transmission means 110 embeds the time ts(i) of the transmitting device 100 immediately before the transmission in the packet and transmits the resultant packet (i =1, 2, . . . , N). The packet reception means 210 records the reception time tr(i) of each packet received by the receiving device 200.

(Step S11)

The packet reception means 210 calculates Qc(j)={tr(j)−tr(1)}−{ts(j)−ts(1)}, thereby calculating (N−1) cumulative queuing delays 40 (j=2, 3, . . . , N).

(Step S12)

The entire section increase-decrease rate calculation means 220 calculates, as the entire section increase-decrease rate 41, the slope of the regression line of the cumulative queuing delays 40, which are (N−1) pieces of time-series data or Qc(j), obtained through linear regression. Alternatively, the entire section increase-decrease rate calculation means 220 may calculate the slope of a straight line connecting the two points of Qc(2) and Qc(N) in the function graph in FIG. 8 as the entire section increase-decrease rate 41.

(Step S13)

The partial section increase-decrease rate calculation means 230 extracts from (N−1) cumulative queuing delays 40, the cumulative queuing delays 40 the number of which is specified by the partial section length 42, as a partial section. When the processing reaches this step for the first time, the partial section increase-decrease rate calculation means 230 may extract, as partial sections, the cumulative queuing delays 40 the number of which is specified by the partial section length 42 from the head packet in the entire section, or the cumulative queuing delays 40 the number of which is specified by the partial section length 42 from the tail packet in the entire section. The partial section increase-decrease rate calculation means 230 stores the packet number of the head packet in the partial section, in the partial section head packet number 43.

(Step S14)

The partial section increase-decrease rate calculation means 230 calculates, as the partial section increase-decrease rate 44, the slope of the regression line of the cumulative queuing delays 40 the number of which is specified by the partial section length 42, obtained through linear regression. Alternatively, the partial section increase-decrease rate calculation means 230 may calculate as the partial section increase-decrease rate 44, the slope of the straight line connecting the two points of the cumulative queuing delays 40 corresponding to the head packet and the tail packet in each partial section in the function graph in FIG. 8.

(Step S15)

The increase-decrease rate comparison means 250 calculates the ratio of the partial section increase-decrease rate 44 to the entire section increase-decrease rate 41. If the ratio is equal to or higher than the increase-decrease rate ratio threshold 45, the processing proceeds to Step S17. If not, the processing proceeds to Step S16. In the fourth partial section from the left in FIG. 8, the ratio of the partial section increase-decrease rate 44 to the entire section increase-decrease rate 41 is equal to or higher than the threshold. The head packet 43 in this partial section can be deemed to have the transmission rate exceeding the available bandwidth.

(Step S16)

If the cumulative queuing delays 40 the number of which is specified by the partial section length 42 are extracted from the head packet in the entire section as the partial section when the processing reaches Step S13 for the first time, the partial section movement means 240 increments the partial section head packet number 43 by an amount corresponding to one packet, and the processing returns to Step S14. In other words, the partial section movement means 240 moves the partial sections by an mount corresponding to one packet in the direction from the head packet toward the tail packet in the entire section. Alternatively, the partial section movement means 240 may increase the value of the partial section head packet number 43 by an amount corresponding to a predetermined number of packets, instead of the amount corresponding to one packet.

If the cumulative queuing delays 40 the number of which is specified by the partial section length 42 are extracted from the tail packet in the entire section as the partial section when the processing reaches Step S13 for the first time, the partial section movement means 240 decrements the partial section head packet number 43 by an amount corresponding to one packet, and the processing returns to Step S14. In other words, the partial section movement means 240 moves the partial sections by an amount corresponding to one packet in the direction from the tail packet toward the head packet in the entire section. Alternatively, the partial section movement means 240 may decrement the partial section head packet number 43 by an amount corresponding to a predetermined number of packets, instead of the amount corresponding to one packet.
(Step S17)

The available bandwidth estimated value calculation means 260 determines the packet size of the k-th packet with the formula P1+(k−1)*ΔP where k is the value of the partial section head packet number 43, and divides the result by the transmission interval Ts. Thus, the available bandwidth 46 as an estimated value of the available bandwidth is calculated. The obtained available bandwidth is stored in the data storage means 270. In this manner, an estimated value of the available bandwidth is calculated in the present invention by determining the macroscopic change point of the increase-decrease rate of the cumulative queuing delays.

The information stored in the data storage means 120 in the transmitting device 100, such as the transmission interval 30, the head packet size 31, the number of packets 32, and the packet incremented amount 33, may be referred to by the receiving device 200 as necessary, or may be transmitted from the transmitting device 100 and stored in the data storage means 270 as appropriate. The information stored in the data storage means 270 in the receiving device 200, such as the cumulative queuing delay 40, the entire section increase-decrease rate 41, the partial section length 42, the partial section head packet number 43, the partial section increase-decrease rate 44, the increase-decrease rate ratio threshold 45, and the available bandwidth 46, may be transmitted to the transmitting device 100 as necessary.

The calculation of the cumulative queuing delays, the calculation of the increase-decrease rate in the entire section, the calculation of the increase-decrease rate in the partial section, the comparison of both increase-decrease rates, and the calculation of the available bandwidth may at least partially be performed by the transmitting device 100. In this case, necessary information, such as the arrival time of each packet in the packet train received by the packet reception means 210 in the receiving device 200, is sent back to the transmitting device 100, and the transmitting device 100 performs the above-described processing.

Figure 3:
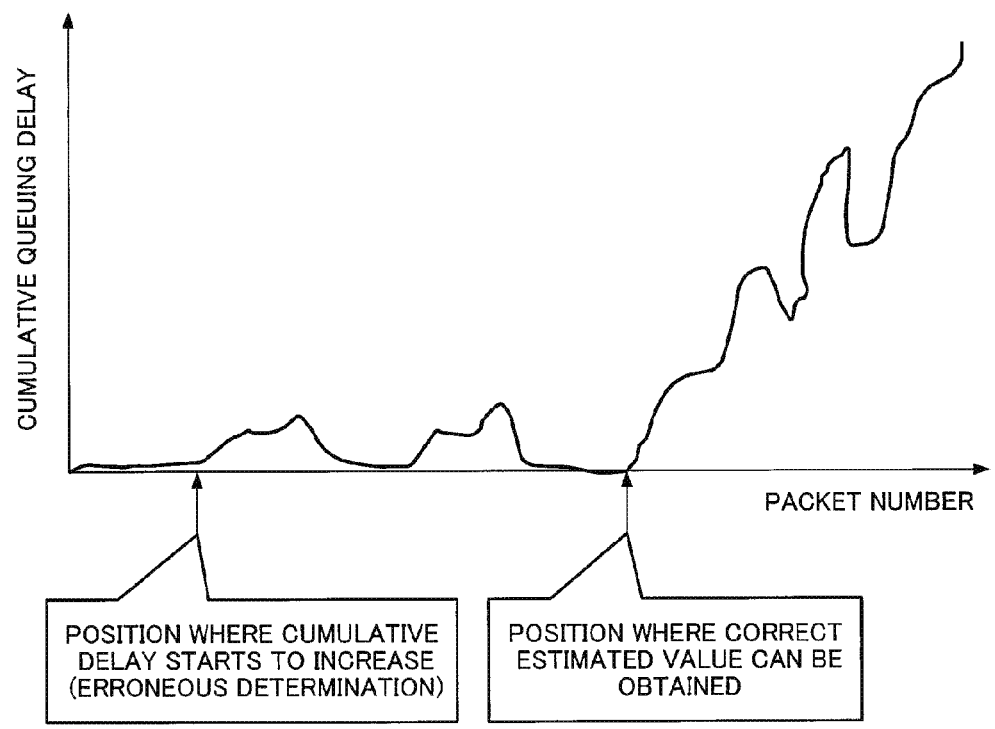
FIG. 3 is a diagram illustrating the related technique.

Through the processing described above, the rising point of the queuing delay can be identified with lower influence of noise causing the cumulative queuing delays to temporarily rise to a positive value to eventually return to 0 as illustrated in FIG. 3, with macroscopic analysis on general tendencies of the cumulative queuing delays in a plurality of packets, that is, through the comparison of the increase-decrease rate in the entire section with the increase-decrease rate in the partial section. All things considered, an effect of improving the estimation accuracy for the available bandwidth in the network involving the noise can be obtained.

(Second Exemplary Embodiment)

A second exemplary embodiment of the present invention is described with reference to the accompanying drawings.

[Description of Configuration]

Figure 9:
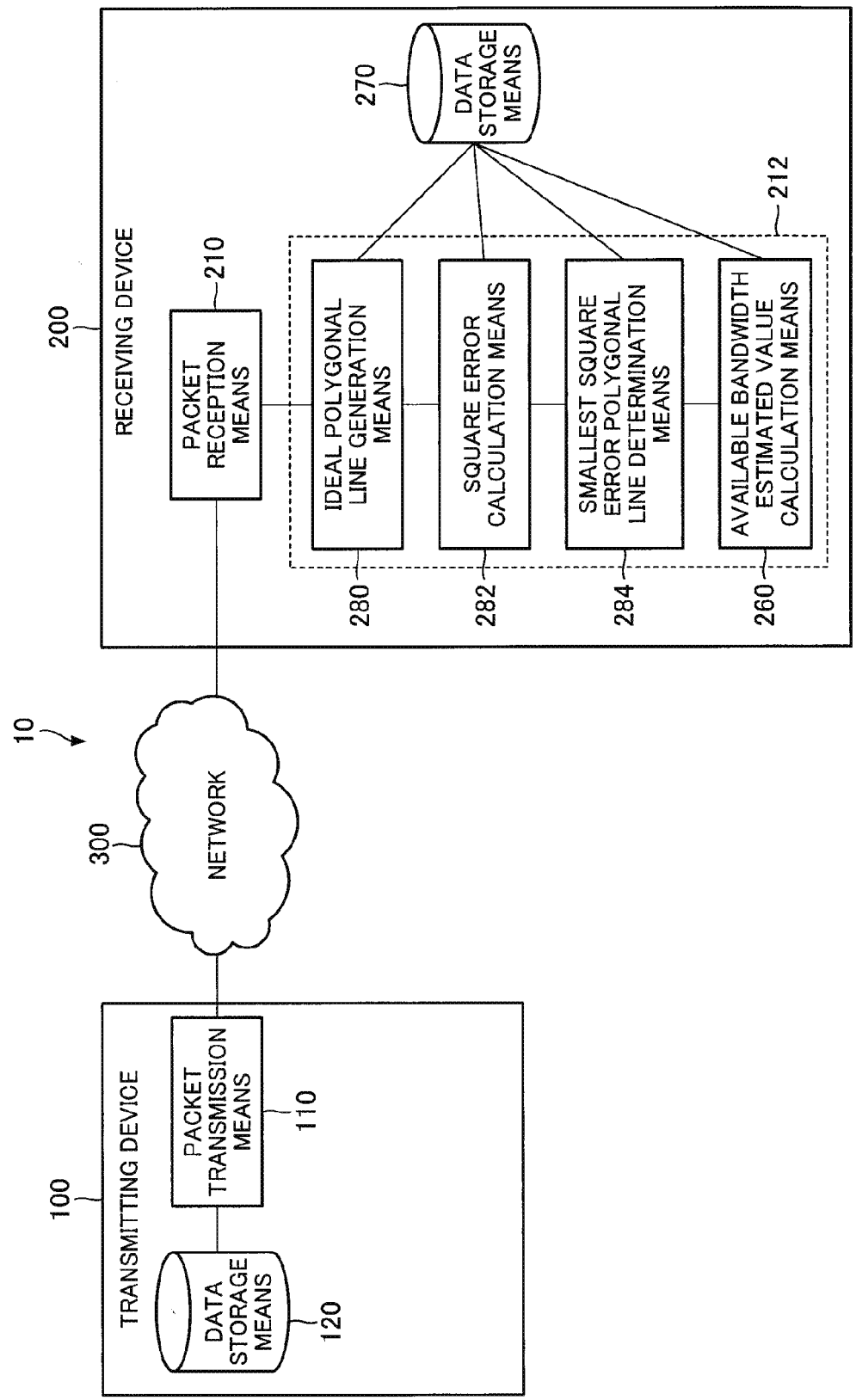
FIG. 9 is a block diagram illustrating a configuration in a second exemplary embodiment of the present invention.
Figure 10:
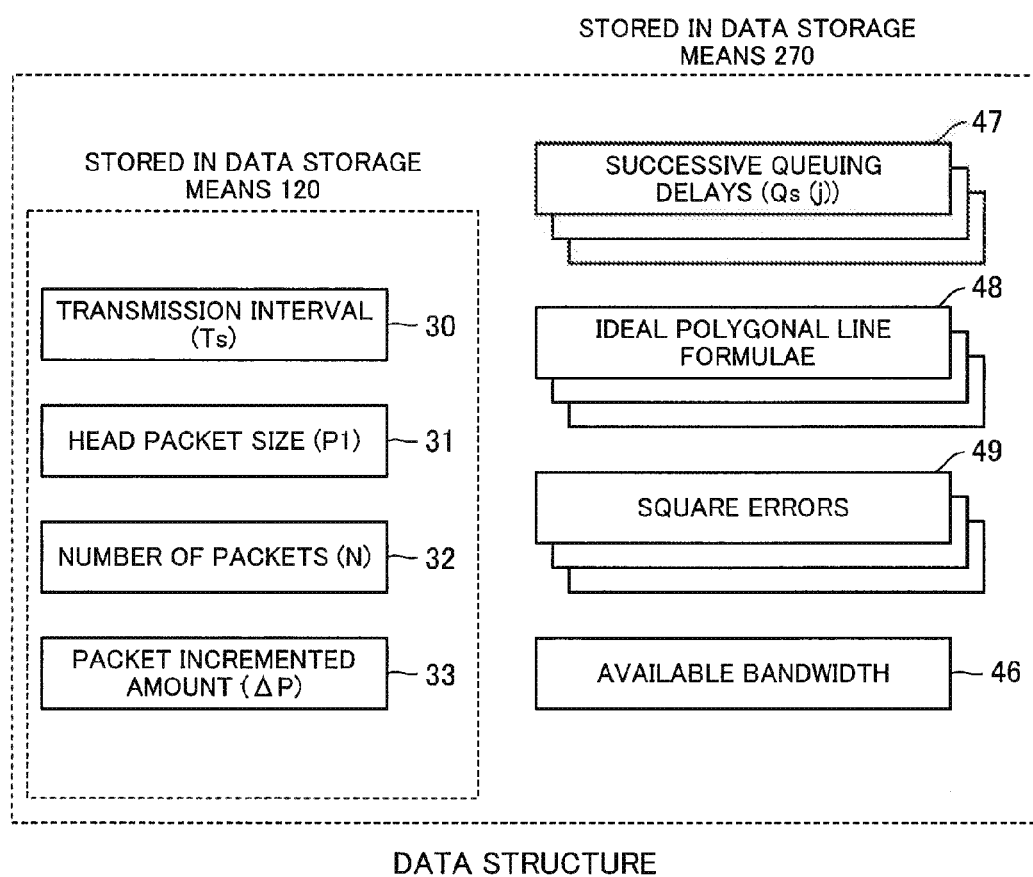
FIG. 10 is a diagram illustrating a data structure in the second exemplary embodiment of the present invention.

FIG. 9 is a block diagram illustrating a configuration in the second exemplary embodiment of the present invention. FIG. 10 illustrates a data structure. The description is given below with reference to these figures.

The transmitting device 100 has the same configuration as that in the first exemplary embodiment of the present invention. The receiving device 200 includes the packet reception means 210, an ideal polygonal line generation means 280, a square error calculation means 282, a smallest square error polygonal line determination means 284, the available bandwidth estimated value calculation means 260, and the data storage means 270. The available bandwidth calculation means 212 may include the ideal polygonal line generation means 280, the square error calculation means 282, the smallest square error polygonal line determination means 284, and the available bandwidth estimated value calculation means 260.

The packet reception means 210 receives a packet train from the packet transmission means 110. The ideal polygonal line generation means 280 generates formulae of a group of polygonal lines representing how the successive queuing delays are mapped on a graph in ideal situations absolutely free from the noises described above. The specific formulae for the group of polygonal lines will be described later.

As illustrated in FIG. 2, the successive queuing delay of the j-th (j=2, 3, . . . , N) packet is obtained as $Qs(j)=\{tr(j)-tr(j-1)\}-\{ts(j)-ts(j-1)\}$. Specifically, $Qs(j)$ is a value obtained by subtracting an elapsed time 18 between the transmission time of the j−1-th packet and the transmission of the j-th packet in the transmitting device from an elapsed time 18 between the reception time of the j−1-th packet and the reception of the j-th packet in the receiving device.

The square error calculation means 282 calculates the square error between the successive queuing delay $Qs(j)$ actually measured in the receiving device 200 and each of the group of (N−1) polygonal lines. The smallest square error polygonal line determination means 284 identifies the smallest one of the (N−1) square errors, and identifies the polygonal line corresponding to the smallest square error.

The available bandwidth estimated value calculation means 260 calculates the available bandwidth 46. The data storage means 270 stores a plurality of successive queuing delays 47, a plurality of ideal polygonal line formulae 48, a plurality of square errors 49, and the available bandwidth 46. The data storage means 270 may store information that is at least partially the same as the transmission interval 30, the head packet size 31, the number of packets 32. And the packet incremented amount 33 stored in the data storage means 120, as needed.

The successive queuing delay 47 is successive queuing delay of each packet in the received packet train. The successive queuing delay of the j-th packet is obtained as $Qs(j)=\{tr(j)-tr(j-1)\}-\{ts(j)-ts(j-1)\}$. Thus, the successive queuing delay is in the form of a function with the packet number as an argument. A single packet train has (N−1) successive queuing delays 47.

Ideal polygonal line formulae 48 are formulae representing the group of polygonal lines, representing how the successive queuing delays are mapped on the graph in ideal situations absolutely free of the noise described above that affects the successive queuing delay measurement. The group of polygonal lines includes (N−1) polygonal lines. First of all, one of the polygonal lines is described. In the ideal situation, an ideal value of the successive queuing delay is 0 as long as the transmission rate of a packet does not exceed the true value of the available bandwidth. When the k-th packet si the first packet to have the transmission rate exceeding the true value Ak of the available bandwidth, an ideal queuing delay QI(m) can be represented as:

$$QI(m)=Pm/Ak(m=k,k+1, \ldots ,N).$$

This formula indicates that the ideal successive queuing delay of an m-th packet can be obtained by dividing a packet size Pm of the m-th packet by the true value Ak of the available bandwidth. Thus, when Ak is fixed, the value of QI(m) increases in proportion to the packet number. This is equivalent to a case where a packet train for estimation flowing in a bottleneck-link with a physical bandwidth C completely occupies a link with a physical bandwidth (not the available bandwidth) having a rate value Ak, and the cross traffic physically flowing in the same bottleneck-link completely flows in a virtually different link with a physical bandwidth having a rate value (C−Ak) at a constant rate so as to not leak, at all, to the (physically the same but virtually different) link where the packet train for the estimation flows.

The formula $$Ql(m)=Pm/Ak=(P1+(m-1)*\Delta P)*Ts/Pk=(\Delta P*Ts/Pk)*m+(P1-\Delta P)*Ts/Pk$$

can be obtained by assigning Pm=P1+(m−1)*ΔP and Ak=Pk/(ts(k)−ts(k−1))=Pk/Ts to Ql(m), and solving the result for m. The formula represents a straight line with a slope having a value ΔP*Ts/Pk.

Figure 12A:
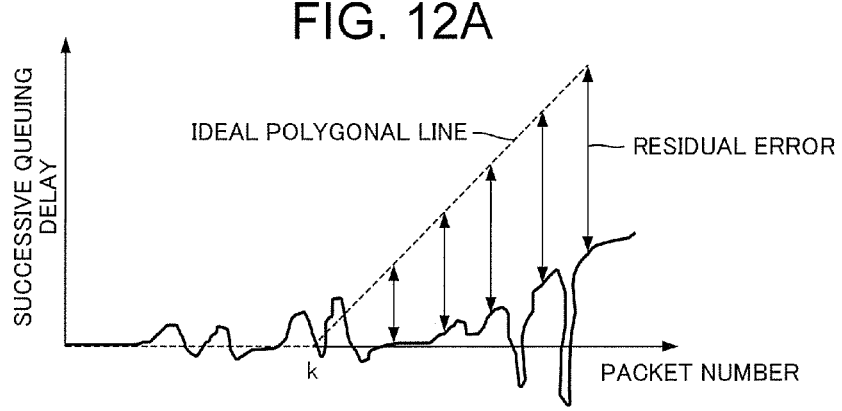
FIG. 12 is a diagram illustrating a principle in the second exemplary embodiment of the present invention.

All things considered, Ql(j) is a polygonal line graph obtained by combining a straight line with Ql(j)=0 when 2≤j<k with the straight line with the slope having the value ΔP*Ts/Pk when k≤j≤N, as illustrated in FIG. 12A.

Figure 12B:
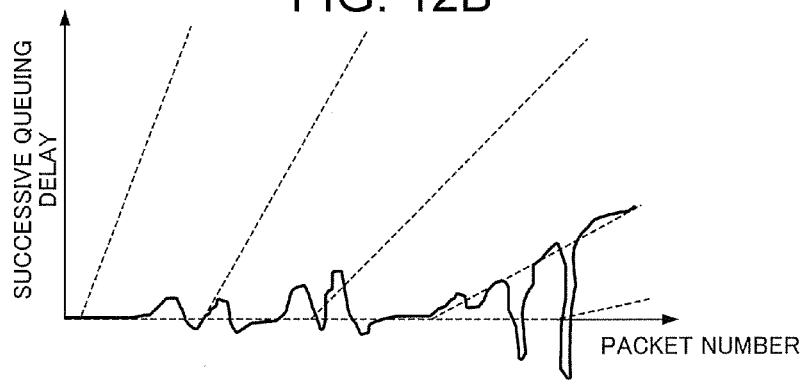

The description is given above on one of the (N−1) ideal polygonal lines in the group of ideal polygonal lines, that is, the description is given i for a case of a fixed value of k. The description is given below on (N−1) ideal polygonal lines obtained by changing k from 2 to N. As described above, the k-th packet is at the starting point of the polygonal line Ql(j), and thus the angular position is changed from 2 to N. The slope of Ql(j) has the value ΔP*Ts/Pk when k≤j≤N. Thus, the denominator Pk increases from a small value to a large value, as k changes from 2 to N, whereby the slope of Ql(j) is gradually relaxed. Thus, the (N−1) ideal polygonal lines, that is, the formulae representing the group of ideal polygonal lines are presented in a graph as illustrated in FIG. 12B.

The square error 49 is a square error between the successive queuing delay Qs(j) actually measure by the receiving device 200 and the ideal polygonal line Ql(j). A single packet train 1 involves (N−1) square errors 49. The available bandwidth 46 is the estimated value of the available bandwidth calculated in the system.

[Description of Processing]

The following describes processing in the present exemplary embodiment with reference to the flowchart in FIG. 11.

(Step S20)

Figure 7:
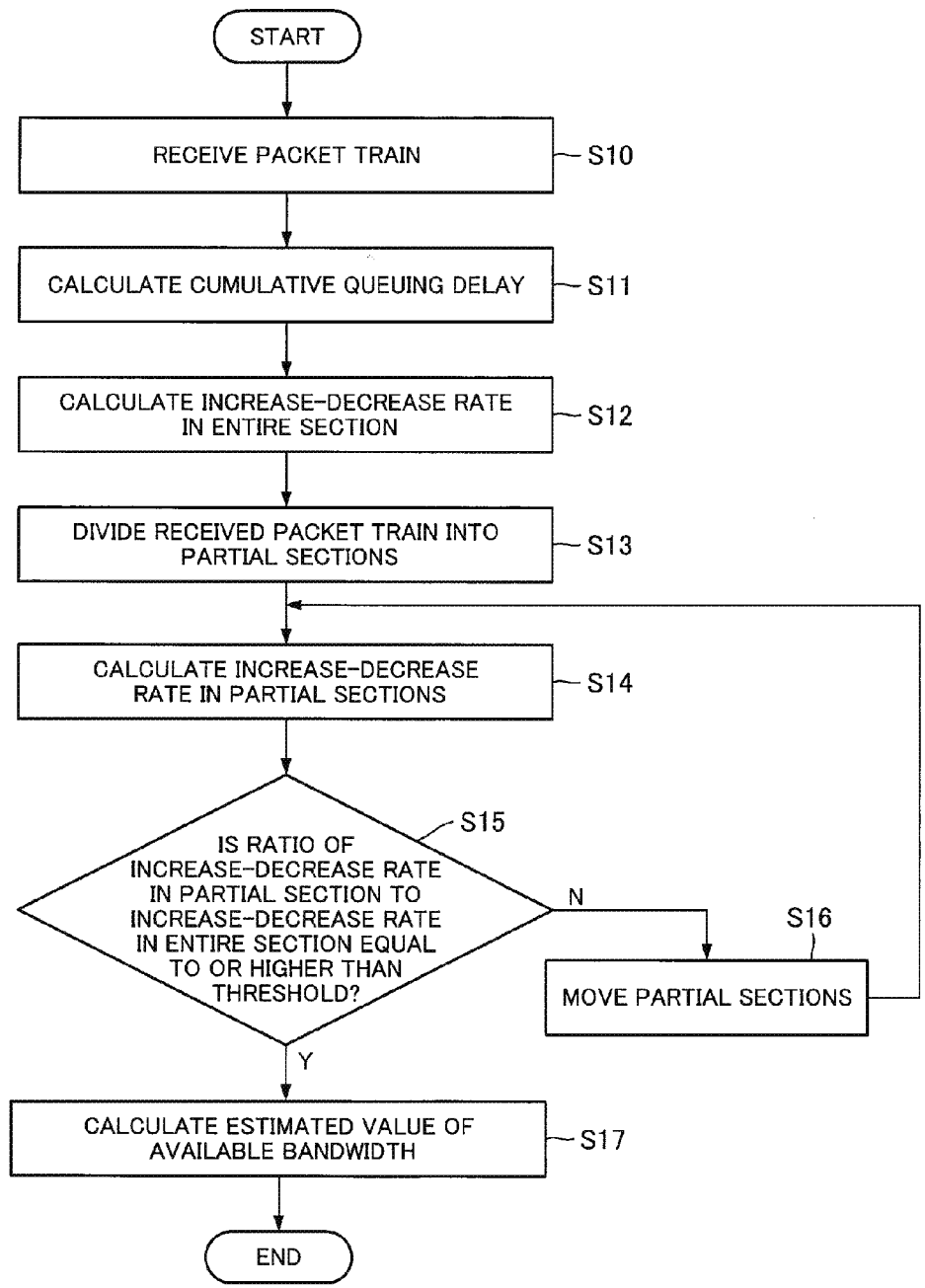
FIG. 7 is a flowchart showing processing in the first exemplary embodiment of the present invention.

This is the same as Step S10 in FIG. 7.

(Step S21)

The packet reception means 210 calculates Qs(j)={tr(j)−tr(j−1)}−{ts(j)−ts(j−1)} to obtain (N−1) successive queuing delays 48 (j=2, 3, . . . , N).

(Step S22)

The ideal polygonal line generation means 280 generates (N−1) ideal polygonal line formulae 48 representing a group of polygonal lines representing how the successive queuing delays are mapped on the graph in the ideal situation.

(Step S23)

The square error calculation means 282 calculates the square error between the successive queuing delay Qs(j) actually measured by the receiving device 200 and each of the (N−1) ideal polygonal lines Ql(j). Specifically, a residual error Qs(j)−Ql(j) illustrated in FIG. 12A is first obtained, and the square sum Σ{Qs(j)−Ql(j)} of the residual error is obtained as a single square error 49. Then, the Σ{Qs(j)−Ql(j)} is obtained with each k incremented from 3 to N, whereby (N−1) square errors 49 are calculated.

(Step S24)

Figure 12C:
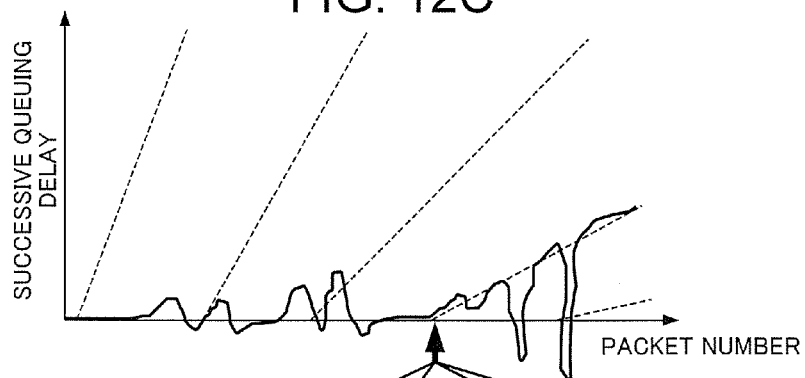

The smallest square error polygonal line determination means 284 identifies the smallest one of the (N−1) square errors 49, and identifies the polygonal line corresponding to the smallest square error 49. The solid polygonal line in FIG. 12C represents the polygonal line thus identified. Thus, the packet at the corner position of the polygonal line can be deemed as the packet having the transmission rate exceeding the available bandwidth.

(Step S25)

The available bandwidth estimated value calculation means 260 divides the packet size of the packet at the corner of the polygonal line identified in Step S24 to calculate the available bandwidth 46 as the estimated value of the available bandwidth. As described above, in the present invention, the estimated value of the available bandwidth is calculated by detecting the change point of the increase-decrease rate of the successive queuing delays. in a macro-view.

Through the processing described above, the rising point of the queuing delay can be identified with lower influence of noise causing the cumulative queuing delays to temporarily rise to a positive value to eventually return to 0 as illustrated in FIG. 3, with macroscopic analysis on general tendencies of the successive queuing delays of a plurality of packets, that is, through identifying the ideal polygonal line most matching the successive queuing delays in the entire section. All things considered, an effect of improving the estimation accuracy for the available bandwidth in the network involving the noise can be obtained.

As described in detail above, in the first exemplary embodiment of the present invention, the increase-decrease rate of the cumulative queuing delay in the entire section of the received packet train, and the increase-decrease rate of the cumulative queuing delay in the partial section of the packet train are calculated and the values of both rates are compared. More specifically, the increase-decrease rate of the cumulative queuing delay in the partial section is calculated while moving the position of the partial section within the packet train, and the increase-decreases rate thus obtained are compared with the increase-decrease rate of the cumulative queuing delay in the entire section to identify the partial section yielding the ratio exceeding the predetermined threshold. The estimated value of the available bandwidth is calculated from the packet size of the head packet and the transmission interval in the partial section.

In the second exemplary embodiment of the present invention, how the successive queuing delays are mapped on the graph in the ideal situation absolutely free of the noise described above is represented by formulae representing a group of polygonal lines. The square error between the successive queuing delay actually measured by the receiving device 200 and each of the polygonal lines is calculated to identify the polygonal line with the smallest square error. The estimated value of the available bandwidth is calculated from the packet size of the packet at the corner of the polygonal line and the transmission interval.

[Effects]

The present invention provides an effect of improving estimation accuracy for the available bandwidth in a network involving noise such as change in cross traffic while transmission of a packet train is in process, change in a field intensity in a wireless network such as a wireless LAN or a mobile phone network, or packet transmission/reception timing disorder attributable to scheduling in a base station.

This can be achieved because the macroscopic analysis on general tendencies of the queuing delays of a plurality of packets enables the rising point of the queuing delay to be identified with lower influence of the noise.

The available bandwidth estimating system described above can be implemented with hardware, software, or combination of these. The available bandwidth estimation method can also be implemented with hardware, software, or combination of these. The implementation by the software means implementation by a computer reading and executing a program.

The program may be stored by using various types of a non-transitory computer readable medium and supplied to the computer. The non-transitory computer readable medium includes various types of a tangible storage medium. Examples of the non-transitory computer readable medium includes a magnetic recording medium (for example, a flexible disk, a magnetic tape, and a hard disk drive), an optical recording medium (for example, a magneto-optic disk), a CD-ROM (Read Only Memory), a CD-R, a CD-R/W, a semiconductor memory (for example, a mask ROM, a PROM (Programmable ROM), an EPROM (Erasable PROM), a flash ROM, and a RAM (random access memory)). The program may be stored in various types of transitory computer readable medium and supplied to the computer. Examples of the transitory computer readable medium include an electrical signal, an optical signal, and electromagnetic waves. With the transitory computer readable medium, the program can be supplied to the computer through a wired communication path such as an electrical wire and an optical fiber or a wireless communication path.

The exemplary embodiments described above can be described as the following notes but are not limited thereto.

(Supplementary Note 1) An available bandwidth estimating system including:
   a transmitting device; and
   a receiving device, wherein
the available bandwidth estimating system estimates an available bandwidth of a network connecting between the transmitting device and the receiving device,
   the transmitting device includes a packet transmission means for transmitting a packet train including a predetermined number of packets with packet sizes incremented by a predetermined increment, in such a manner that the packets are transmitted at regular intervals, and
   the receiving device includes:
      a packet reception means for receiving the packet train from the packet transmission means, and calculating cumulative queuing delays of the packets in the packet train; and
      an available bandwidth calculation means for calculating an estimated value of the available bandwidth by detecting a macroscopic change point of an increase-decrease rate of the cumulative queuing delays.

(Supplementary Note 2) The available bandwidth estimating system according to Supplementary Note 1, wherein
   the available bandwidth calculation means includes:
   an entire section increase-decrease rate calculation means for calculating the increase-decrease rate of the cumulative queuing delays calculated by the packet reception means in an entire section of the packet train received by the packet reception means;
   a partial section increase-decrease rate calculation means for calculating the increase-decrease rate of the cumulative queuing delays calculated by the packet reception means in a partial section of the packet train received by the packet reception means;
   an increase-decrease rate comparison means for comparing a ratio of a value of the increase-decrease rate in the partial section calculated by the partial section increase-decrease rate calculation means to a value of the increase-decrease rate in the entire section calculated by the entire section increase-decrease rate calculation means with a predetermined threshold; and
   an available bandwidth estimated value calculation means for calculating the estimated value of the available bandwidth when a result of the comparison performed by the increase-decrease rate comparison means indicates that the ratio is equal to or higher than the threshold.

(Supplementary Note 3) The available bandwidth estimating system according to Supplementary Note 2 further including a partial section movement means for moving the partial section of the packet train in which the increase-decrease rate is calculated by the partial section increase-decrease rate calculation means when the result of the comparison performed by the increase-decrease rate comparison means indicates that the ratio is lower than the threshold.

(Supplementary Note 4) The available bandwidth estimating system according to Supplementary Note 2 or 3, wherein the entire section increase-decrease rate calculation means calculates, as the increase-decrease rate in the entire section, a slope of a regression line of the cumulative queuing delays as a plurality of time-series data pieces calculated by the packet reception means, through linear regression.

(Supplementary Note 5) The available bandwidth estimating system according to Supplementary Note 2 or 3, wherein the entire section increase-decrease rate calculation means calculates, as the increase-decrease rate in the entire section, a slope of a line connecting a head and a tail of the cumulative queuing delays as a plurality of time-series data pieces calculated by the packet reception means.

(Supplementary Note 6) The available bandwidth estimating system according to any one of Supplementary Notes 2 to 5, wherein the partial section increase-decrease rate calculation means calculates, as the increase-decrease rate in the partial section, a slope of a regression line of cumulative queuing delays in the partial section out of the cumulative queuing delays as a plurality of time-series data pieces calculated by the packet reception means, through linear regression.

(Supplementary Note 7) The available bandwidth estimating system according to any one of Supplementary Notes 2 to 5, wherein the partial section increase-decrease rate calculation means calculates, as the increase-decrease rate in the partial section, a slope of a line connecting a head and a tail of cumulative queuing delays in the partial section out of the cumulative queuing delays as a plurality of time-series data pieces calculated by the packet reception means.

(Supplementary Note 8) The available bandwidth estimating system according to any one of Supplementary Notes 2 to 7, wherein the available bandwidth estimated value calculation means calculates the estimated value of the available bandwidth by dividing a packet size of a head packet in the partial section by a transmission interval.

(Supplementary Note 9) The available bandwidth estimating system according to any one of Supplementary Notes 2 to 8, wherein the partial section increase-decrease rate calculation means divides the received packet train into the partial sections, and extracts the cumulative queuing delays in the number designated by a predetermined partial section length starting from the head packet in the entire section, as the partial section.

(Supplementary Note 10) The available bandwidth estimating system according to any one of Supplementary Notes 2 to 8, wherein the partial section increase-decrease rate calculation means divides the received packet train into the partial sections, and extracts the cumulative queuing delays in the number designated by a predetermined partial section length starting from the tail packet in the entire section, as the partial section.

(Supplementary Note 11) The available bandwidth estimating system according to any one of Supplementary Notes 3 to 10, wherein the partial section movement means moves the partial section in a direction from the head packet to the tail packet in the entire section, by an amount corresponding to one packet.

(Supplementary Note 12) The available bandwidth estimating system according to any one of Supplementary Notes 3 to 10, wherein the partial section movement means moves the partial section in a direction from the head packet to the tail packet in the entire section, by an amount corresponding to a plurality of predetermined packets.

(Supplementary Note 13) The available bandwidth estimating system according to any one of Supplementary Notes 3 to 10, wherein the partial section movement means moves the partial section in a direction toward the tail packet to the head packet in the entire section, by an amount corresponding to one packet.

(Supplementary Note 14) The available bandwidth estimating system according to any one of Supplementary Notes 3 to 10, wherein the partial section movement means moves the partial section in a direction toward the tail packet to the head packet in the entire section, by an amount corresponding to a plurality of predetermined packets.

(Supplementary Note 15) An available bandwidth estimating system including:
a transmitting device; and
a receiving device, wherein
the available bandwidth estimating system estimates an available bandwidth of a network connecting between the transmitting device and the receiving device,
the transmitting device includes a packet transmission means for transmitting a packet train including a predetermined number of packets with packet sizes incremented by a predetermined increment, in such a manner that the packets are transmitted at regular intervals, and
the receiving device includes:
a packet reception means for receiving the packet train from the packet transmission means, and calculating successive queuing delays of the packets in the packet train; and
an available bandwidth calculation means for calculating an estimated value of the available bandwidth by detecting a macroscopic change point of an increase-decrease rate of the successive queuing delays.

(Supplementary Note 16) The available bandwidth estimating system according to Supplementary Note 15, wherein the available bandwidth calculation means includes:
an ideal polygonal line generation means for generating a formulae representing ideal polygonal lines representing the successive queuing delays in an ideal state free of noise affecting the successive queuing delays;
a square error calculation means for calculating square errors between the successive queuing delay calculated by the packet reception means and the formulae representing the ideal polygonal lines generated by the ideal polygonal line generation means; and a smallest square error polygonal line determination means for identifying the ideal polygonal line with a smallest one of the square errors calculated by the square error calculation means; and
an available bandwidth estimated value calculation means for calculating the estimated value of the available bandwidth on the base of the ideal polygonal line identified by the smallest square error polygonal line determination means.

(Supplementary Note 17) The available bandwidth estimating system according to Supplementary Note 15, wherein the ideal polygonal line generation means generates a formula representing a polygonal line obtained by combining a first straight line in a range where the transmission rate of the packet does not exceed a true value of the available bandwidth and a second straight line in a range where the transmission rate of the packet exceeds the true value of the available bandwidth in a graph having a horizontal axis representing the packet numbers sequentially provided from the head packet to the tail packet of the packet train and a vertical axis representing the successive queuing delay, the first straight line passing through an origin and having a slope of 0, the second straight line passing through a point with a value on the horizontal axis corresponding to the packet number of the first packet to have the transmission rate exceeding the true of the available bandwidth and a value 0 on the horizontal axis and having a slope as a value obtained by dividing a product of the increment for the packet and the transmission interval by the packet size of the first packet to have the transmission rate exceeding the true value of the available bandwidth.

(Supplementary Note 18) The available bandwidth estimating system according to Supplementary Note 16 or 17, wherein the square error is a square sum of a residual error between the successive queuing delay actually calculated by the packet reception means and each of the plurality of ideal polygonal lines.

(Supplementary Note 19) The available bandwidth estimating system according to any one of Supplementary Notes 16 to 18, wherein the available bandwidth calculation means calculates the estimated value of the available bandwidth by diving the packet size of the packet at a corner of the polygonal line identified by the smallest square error polygonal line determination means by the transmission interval.

(Supplementary Note 20) A receiving device including:
a packet reception means for receiving a packet train including a predetermined number of packets with packet sizes incremented by a predetermined increment and transmitted in such a manner that the packets are transmitted at regular intervals, and calculating a cumulative queuing delays of the packets in the packet train;
an entire section increase-decrease rate calculation means for calculating the increase-decrease rate of the cumulative queuing delays calculated by the packet reception means in an entire section of the packet train received by the packet reception means;
a partial section increase-decrease rate calculation means for calculating the increase-decrease rate of the cumulative queuing delays calculated by the packet reception means in a partial section of the packet train received by the packet reception means;
an increase-decrease rate comparison means for comparing a ratio of a value of the increase-decrease rate in the partial section calculated by the partial section increase-decrease rate calculation means to a value of the increase-decrease rate in the entire section calculated by the entire section increase-decrease rate calculation means with a predetermined threshold; and an available bandwidth estimated value calculation means for calculating the estimated value of the available bandwidth when a result of the comparison performed by the increase-decrease rate comparison means indicates that the ratio is equal to or higher than the threshold.

(Supplementary Note 21) An available bandwidth estimating method for estimating an available bandwidth of a network connecting between a transmitting device and a receiving device, the available bandwidth estimating method including:

a packet transmission step of transmitting a packet train including a predetermined number of packets with packet sizes incremented by a predetermined increment, in such a manner that the packets are transmitted at regular intervals from the transmitting device;

a packet reception step of receiving the packet train transmitted in the packet transmission step by the receiving device, and calculating cumulative queuing delays of the packets in the packet train;

an available bandwidth calculation step of calculating an estimated value of the available bandwidth by detecting a macroscopic change point of an increase-decrease rate of the cumulative queuing delays.

(Supplementary Note 22) An available bandwidth estimating method for estimating an available bandwidth of a network connecting between a transmitting device and a receiving device, the available bandwidth estimating method including:

a packet transmission step of transmitting a packet train including a predetermined number of packets with packet sizes incremented by a predetermined increment, in such a manner that the packets are transmitted at regular intervals from the transmitting device;

a packet reception step of receiving the packet train transmitted in the packet transmission step by the receiving device, and calculating cumulative queuing delays of the packets in the packet train;

an entire section increase-decrease rate calculation step of calculating the increase-decrease rate of the cumulative queuing delays calculated in the packet reception step in an entire section of the packet train received in the packet reception step;

a partial section increase-decrease rate calculation step of calculating the increase-decrease rate of the cumulative queuing delays calculated in the packet reception step in a partial section of the packet train received in the packet reception step;

an increase-decrease rate comparison step of comparing a ratio of a value of the increase-decrease rate in the partial section calculated in the partial section increase-decrease rate calculation step to a value of the increase-decrease rate in the entire section calculated in the entire section increase-decrease rate calculation step with a predetermined threshold; and an available bandwidth calculation step of calculating the estimated value of the available bandwidth when a result of the comparison performed in the increase-decrease rate comparison step indicates that the ratio is equal to or higher than the threshold.

(Supplementary Note 23) The available bandwidth estimating method according to Supplementary Note 22, wherein the partial section increase-decrease rate calculation step includes a partial section movement step of moving the partial section of the packet train as a target of the calculation for the increase-decrease rate, when a result of the comparison in the increase-decrease rate comparison step indicates that the ratio is smaller than the threshold.

(Supplementary Note 24) The available bandwidth estimating method according to Supplementary Note 22 or 23, wherein in the entire section increase-decrease rate calculation step, a slope of a regression line of the cumulative queuing delays as a plurality of time-series data pieces calculated in the packet reception step is calculated through linear regression, as the increase-decrease rate in the entire section.

(Supplementary Note 25) The available bandwidth estimating method according to Supplementary Note 22 or 23, wherein in the entire section increase-decrease rate calculation step, a slope of a straight line connecting between a head and a tail of the cumulative queuing delays as a plurality of time-series data pieces calculated in the packet reception step is calculated as the increase-decrease rate in the entire section.

(Supplementary Note 26) The available bandwidth estimating method according to any one of Supplementary Notes 22 or 25, wherein in the entire section increase-decrease rate calculation step, a slope of a regression line of the cumulative queuing delays in the partial section out of the cumulative queuing delays as a plurality of time-series data pieces calculated in the packet reception step is calculated through linear regression, as the increase-decrease rate in the partial section.

(Supplementary Note 27) The available bandwidth estimating method according to any one of Supplementary Notes 22 or 25, wherein in the entire section increase-decrease rate calculation step, a slope of a regression line of the cumulative queuing delays in the partial section out of the cumulative queuing delays as a plurality of time-series data pieces calculated in the packet reception step is calculated in the partial section as the increase-decrease rate in the partial section.

(Supplementary Note 28) The available bandwidth estimating method according to any one of Supplementary Notes 22 or 27, wherein in the partial section increase-decrease rate calculation step, the received packet train is divided into the partial sections, and the cumulative queuing delays in the number designated by a predetermined partial section length starting from the head packet in the entire section are extracted as the partial section.

(Supplementary Note 29) The available bandwidth estimating method according to any one of Supplementary Notes 22 or 27, wherein in the partial section increase-decrease rate calculation step, the received packet train is divided into the partial sections, and the cumulative queuing delays in the number designated by a predetermined partial section length starting from the tail packet in the entire section are extracted as the partial section.

(Supplementary Note 30) The available bandwidth estimating method according to any one of Supplementary Notes 22 to 29, wherein in the partial section movement step, the partial section is moved in a direction from the head packet to the tail packet in the entire section, by an amount corresponding to one packet.

(Supplementary Note 31) The available bandwidth estimating method according to any one of Supplementary Notes 22 to 29, wherein in the partial section movement step, the partial section is moved in a direction from the head packet to the tail packet in the entire section, by an amount corresponding to a plurality of predetermined packets.

(Supplementary Note 32) The available bandwidth estimating method according to any one of Supplementary Notes 22 to 29, wherein in the partial section movement step, the partial section is moved in a direction from the tail packet to the head packet in the entire section, by an amount corresponding to one packet.

(Supplementary Note 33) The available bandwidth estimating method according to any one of Supplementary Notes 22 to 29, wherein in the partial section movement step, the partial section is moved in a direction from the tail packet to the head packet in the entire section, by an amount corresponding to a plurality of predetermined packets.

(Supplementary Note 34) The available bandwidth estimating method according to any one of Supplementary Notes 22 or 33, wherein in the available bandwidth calculation step, the estimated value of the available bandwidth is obtained by dividing the packet size of the head packet in the partial section by the transmission interval.

(Supplementary Note 35) An available bandwidth estimating method for estimating an available bandwidth of a network connecting between a transmitting device and a receiving device, the available bandwidth estimating method including:

a packet transmission step of transmitting a packet train including a predetermined number of packets with packet sizes incremented by a predetermined increment, in such a manner that the packets are transmitted at regular intervals from the transmitting device;

a packet reception step of receiving the packet train transmitted in the packet transmission step by the receiving device, and calculating successive queuing delays of the packets in the packet train; and an available bandwidth calculation step of calculating an estimated value of the available bandwidth by detecting a macroscopic change point of an increase-decrease rate of the successive queuing delays.

(Supplementary Note 36) An available bandwidth estimating method for estimating an available bandwidth of a network connecting between a transmitting device and a receiving device, the available bandwidth estimating method including:

a packet transmission step of transmitting a packet train including a predetermined number of packets with packet sizes incremented by a predetermined increment, in such a manner that the packets are transmitted at regular intervals from the transmitting device;

a packet reception step of receiving the packet train transmitted in the packet transmission step by the receiving device, and calculating successive queuing delays of the packets in the packet train;

an ideal polygonal line generation step of generating a formulae representing ideal polygonal lines representing the successive queuing delays in an ideal state free of noise affecting the successive queuing delays;

a square error calculation step of calculating square errors between the successive queuing delays calculated by the packet reception means and the formulae representing the ideal polygonal lines generated by the ideal polygonal line generation means;

a smallest square error polygonal line determination step of identifying the ideal polygonal line with a smallest one of the square errors calculated in the square error calculation step; and an available bandwidth estimated value calculation step of calculating the estimated value of the available bandwidth on the base of the ideal polygonal line identified in the smallest square error polygonal line determination step.

(Supplementary Note 37) The available bandwidth estimating method according to Supplementary Note 36, wherein in the ideal polygonal line step, a formula representing a polygonal line obtained by combining a first straight line in a range where the transmission rate of the packet does not exceed a true value of the available bandwidth and a second straight line in a range where the transmission rate of the packet exceeds the true value of the available bandwidth in a graph having a horizontal axis representing the packet numbers sequentially provided from the head packet to the tail packet of the packet train and a vertical axis representing the successive queuing delay is generated, the first straight line passing through an origin and having a slope of 0, the second straight line passing through a point with a value on the horizontal axis corresponding to the packet number of the first packet to have the transmission rate exceeding the true of the available bandwidth and a value 0 on the horizontal axis and having a slope as a value obtained by dividing a product of the increment for the packet and the transmission interval by the packet size of the first packet to have the transmission rate exceeding the true value of the available bandwidth.

(Supplementary Note 38) The available bandwidth estimating method according to Supplementary Note 36 or 37, wherein the square error is a square sum of a residual error between the successive queuing delay actually calculated in the packet reception step and each of the plurality of ideal polygonal lines.

(Supplementary Note 39) The available bandwidth estimating method according to any one of Supplementary Notes 36 to 38, wherein in the available bandwidth calculation step, the estimated value of the available bandwidth is calculated by dividing the packet size of the packet at a corner of the polygonal line identified in the smallest square error polygonal line determination step by the transmission interval.

(Supplementary Note 40) An available bandwidth estimating program for estimating an available bandwidth of a network connecting between a transmitting device and a receiving device, the available bandwidth estimating program causing a computer to achieve:

a packet transmission function of transmitting a packet train including a predetermined number of packets with packet sizes incremented by a predetermined increment, in such a manner that the packets are transmitted at regular intervals from the transmitting device;

a packet reception function of receiving the packet train transmitted in the packet transmission step by the receiving device, and calculating cumulative queuing delays of the packets in the packet train;

an available bandwidth calculation function of calculating an estimated value of the available bandwidth by detecting a macroscopic change point of an increase-decrease rate of the cumulative queuing delays.

(Supplementary Note 41) An available bandwidth estimating program for estimating an available bandwidth of a network connecting between a transmitting device and a receiving device, the available bandwidth estimating program causing a computer to achieve:

a packet transmission function of transmitting a packet train including a predetermined number of packets with packet sizes incremented by a predetermined increment, in such a manner that the packets are transmitted at regular intervals from the transmitting device;

a packet reception function of receiving the packet train transmitted by the packet transmission function by the receiving device, and calculating cumulative queuing delays of the packets in the packet train;

an entire section increase-decrease rate calculation function of calculating the increase-decrease rate of the cumulative queuing delays calculated by the packet reception function in an entire section of the packet train received by the packet reception function;

a partial section increase-decrease rate calculation function of calculating the increase-decrease rate of the cumulative queuing delay calculated by the packet reception function in a partial section of the packet train received by the packet reception function;

an increase-decrease rate comparison function of comparing a ratio of a value of the increase-decrease rate in the partial section calculated by the partial section increase-decrease rate calculation function to a value of the increase-decrease rate in the entire section calculated by the entire section increase-decrease rate calculation function with a predetermined threshold; and an available bandwidth calculation function of calculating the estimated value of the available bandwidth when a result of the comparison performed by the increase-decrease rate comparison function indicates that the ratio is equal to or higher than the threshold.

(Supplementary Note 42) The available bandwidth estimating program according to Supplementary Note 41, wherein partial section increase-decrease rate calculation function includes a partial section movement function of moving the partial section of the packet train as a target of the calculation for the increase-decrease rate, when a result of the comparison in the increase-decrease rate comparison step indicates that the ratio is smaller than the threshold.

(Supplementary Note 43) The available bandwidth estimating program according to Supplementary Note 41 or 42, wherein by the entire section increase-decrease rate calculation function, a slope of a regression line of the cumulative queuing delays as a plurality of time-series data pieces calculated by the packet reception function is calculated through linear regression, as the increase-decrease rate in the entire section.

(Supplementary Note 44) The available bandwidth estimating method according to Supplementary Note 41 or 42, wherein by the entire section increase-decrease rate calculation function, a slope of a straight line connecting between a head and a tail of the cumulative queuing delays as a plurality of time-series data pieces calculated by the packet reception function is calculated, as the increase-decrease rate in the entire section.

(Supplementary Note 45) The available bandwidth estimating program according to any one of Supplementary Notes 41 or 44, wherein by the entire section increase-decrease rate calculation function, a slope of a regression line of the cumulative queuing delays in the partial section out of the cumulative queuing delays as a plurality of time-series data pieces calculated by the packet reception function is calculated through linear regression, as the increase-decrease rate in the partial section.

(Supplementary Note 46) The available bandwidth estimating method according to any one of Supplementary Notes 41 or 44, wherein by the entire section increase-decrease rate calculation function, a slope of a straight line connecting between a head and a tail of the cumulative queuing delays in the partial section out of the cumulative queuing delays as a plurality of time-series data pieces calculated by the packet reception function is calculated, in the partial section as the increase-decrease rate in the partial section.

(Supplementary Note 47) The available bandwidth estimating program according to any one of Supplementary Notes 41 or 46, wherein by the partial section increase-decrease rate calculation function, the received packet train is divided into the partial sections, and the cumulative queuing delays in the number designated by a predetermined partial section length starting from the head packet in the entire section are extracted as the partial section.

(Supplementary Note 48) The available bandwidth estimating program according to any one of Supplementary Notes 41 or 46, wherein by the partial section increase-decrease rate calculation function, the received packet train is divided into the partial sections, and the cumulative queuing delays in the number designated by a predetermined partial section length starting from the tail packet in the entire section are extracted as the partial section.

(Supplementary Note 49) The available bandwidth estimating program according to any one of Supplementary Notes 41 to 48, wherein by the partial section movement function, the partial section is moved in a direction from the head packet to the tail packet in the entire section, by an amount corresponding to one packet (Supplementary Note 50) The available bandwidth estimating program according to any one of Supplementary Notes 41 to 48, wherein by the partial section movement function, the partial section is moved in a direction from the head packet to the tail packet in the entire section, by an amount corresponding to a plurality of predetermined packets.

(Supplementary Note 51) The available bandwidth estimating program according to any one of Supplementary Notes 41 to 48, wherein by the partial section movement function, the partial section is moved in a direction from the tail packet to the head packet in the entire section, by an amount corresponding to one packet.

(Supplementary Note 52) The available bandwidth estimating program according to any one of Supplementary Notes 41 to 48, wherein by the partial section movement function, the partial section is moved in a direction from the tail packet to the head packet in the entire section, by an amount corresponding to a plurality of predetermined packets.

(Supplementary Note 53) The available bandwidth estimating program according to any one of Supplementary Notes 41 or 52, wherein by the available bandwidth calculation function, the estimated value of the available bandwidth is obtained by dividing the packet size of the head packet in the partial section by the transmission interval.

(Supplementary Note 54) An available bandwidth estimating program for estimating an available bandwidth of a network connecting between a transmitting device and a receiving device, the available bandwidth estimating program causing a computer to achieve:

a packet transmission function of transmitting a packet train including a predetermined number of packets with packet sizes incremented by a predetermined increment, in such a manner that the packets are transmitted at regular intervals from the transmitting device;

a packet reception function of receiving the packet train transmitted in the packet transmission step by the receiving device, and calculating successive queuing delays of the packets in the packet train;

an available bandwidth calculation function of calculating an estimated value of the available bandwidth by detecting a macroscopic change point of an increase-decrease rate of the successive queuing delays.

(Supplementary Note 55) An available bandwidth estimating program for estimating an available bandwidth of a network connecting between a transmitting device and a receiving device, the available bandwidth estimating program causing a computer to achieve:

a packet transmission function of transmitting a packet train including a predetermined number of packets with packet sizes incremented by a predetermined increment, in such a manner that the packets are transmitted at regular intervals from the transmitting device;

a packet reception function of receiving the packet train transmitted by the packet transmission function by the receiving device, and calculating successive queuing delays of the packets in the packet train;

an ideal polygonal line generation function of generating a formulae representing ideal polygonal lines representing the successive queuing delays in an ideal state free of noise affecting the successive queuing delays;

a square error calculation function of calculating square errors between the successive queuing delays calculated by the packet reception function and the formulae representing the ideal polygonal lines generated by the ideal polygonal line generation function;

a smallest square error polygonal line determination function of identifying the ideal polygonal line with a smallest one of the square errors calculated by the square error calculation function; and an available bandwidth estimated value calculation function of calculating the estimated value of the available bandwidth on the base of the ideal polygonal line identified by the smallest square error polygonal line determination function.

(Supplementary Note 56) The available bandwidth estimating program according to Supplementary Note 55, wherein by the ideal polygonal line function, a formula representing a polygonal line obtained by combining a first straight line in a range where the transmission rate of the packet does not exceed a true value of the available bandwidth and a second straight line in a range where the transmission rate of the packet exceeds the true value of the available bandwidth in a graph having a horizontal axis representing the packet numbers sequentially provided from the head packet to the tail packet of the packet train and a vertical axis representing the successive queuing delay is generated, the first straight line passing through an origin and having a slope of 0, the second straight line passing through a point with a value on the horizontal axis corresponding to the packet number of the first packet to have the transmission rate exceeding the true of the available bandwidth and a value 0 on the horizontal axis and having a slope as a value obtained by dividing a product of the increment for the packet and the transmission interval by the packet size of the first packet to have the transmission rate exceeding the true value of the available bandwidth.

(Supplementary Note 57) The available bandwidth estimating program according to Supplementary Note 55 or 56, wherein the square error is a square sum of a residual error between the successive queuing delay actually calculated by the packet reception function and each of the plurality of ideal polygonal lines.

(Supplementary Note 58) The available bandwidth estimating program according to any one of Supplementary Notes 55 to 57, wherein by the available bandwidth calculation function, the estimated value of the available bandwidth is calculated by diving the packet size of the packet at a corner of the polygonal line identified by the smallest square error polygonal line determination function by the transmission interval.

This application claims priority based on Japanese Patent Application Laid-open No. 2012-166897 filed on 27 Jul. 2012, the content of which is herein incorporated by reference.

INDUSTRIAL APPLICABILITY

The present invention may be effectively used to ensure image quality in video chat, videophone, TV conference, and the like involving communications in both directions between terminals to transmit images by preventing the sum of the image transmission rate and the cross traffic from exceeding a bottleneck-link physical bandwidth, thereby preventing a packet loss.

REFERENCE SIGNS LIST 10 available bandwidth estimating system
100 transmitting device
110 packet transmission means
120 data storage means
200 receiving device
210 packet reception means
212 available bandwidth calculation means
220 entire section increase-decrease rate calculation means
230 partial section increase-decrease rate calculation means
240 partial section movement means
250 increase-decrease rate comparison means
260 available bandwidth estimated value calculation means
270 data storage means
280 ideal polygonal line generation means
282 square error calculation means
284 smallest square error polygonal line determination means

What is claimed is:
1. A receiving device comprising:
a memory storing instructions;
at least one processor configured to process the instructions to:
receive a packet train including a predetermined number of packets with packet sizes incremented by a predetermined increment and transmitted in such a manner that the packets are transmitted at regular intervals, and calculate a queuing delays of the packets in the packet train;
calculate an estimated value of an available bandwidth by detecting a macroscopic change point of an increase-decrease rate of the queuing delays, by:
generating a formulae representing ideal polygonal lines representing the queuing delays in an ideal state free of noise affecting the queuing delays;
calculating square errors between the queuing delay and the formulae representing the ideal polygonal lines; and
identifying the ideal polygonal line with a smallest one of the square errors; and
calculating the estimated value of the available bandwidth based on the ideal polygonal line.
2. The receiving device according to claim 1, wherein the queuing delays are cumulative queuing delays of the packets in the packet train or successive queuing delays of the packets in the packet train.

3. The receiving device according to claim 1, wherein the queuing delays are cumulative queuing delays of the packets in the packet train, and wherein the estimate value of the available bandwidth is calculated by further:
  calculating an increase-decrease rate of the cumulative queuing delays in an entire section of the packet train;
  calculating an increase-decrease rate of the cumulative queuing delays in a partial section of the packet train;
  comparing a ratio of a value of the increase-decrease rate in the partial section to a value of the increase-decrease rate in the entire section with a predetermined threshold; and
  calculating the estimated value of the available bandwidth when a result of the comparison is equal to or higher than the predetermined threshold.

4. The receiving device according to claim 3 wherein the at least one processor is configured to process the instructions to further move the partial section of the packet train in which the increase-decrease rate is calculated when the result of the comparison indicates that the ratio is lower than the predetermined threshold.

5. The receiving device according to claim 3, wherein the increase-decrease rate in the entire section is calculated a slope of a regression line of the cumulative queuing delays as a plurality of time-series data pieces, through linear regression.

6. The receiving device according to claims 3, wherein the estimated value of the available bandwidth is calculated by dividing a packet size of a head packet in the partial section by a transmission interval.

7. An available bandwidth estimating system comprising:
  a transmitting device; and
  a receiving device according to entire claim 1, wherein the transmitting device transmits a packet train including a predetermined number of packets with packet sizes incremented by a predetermined increment, in such a manner that the packets are transmitted at regular intervals.

8. An available bandwidth estimating method for estimating an available bandwidth of a network connecting between a transmitting device and a receiving device, the available bandwidth estimating method comprising:
  a packet reception step of receiving a packet train including a predetermined number of packets with packet sizes incremented by a predetermined increment and transmitted in such a manner that the packets are transmitted at regular intervals, and calculating a queuing delays of the packets in the packet train;
  an ideal polygonal line generation step of generating a formulae representing ideal polygonal lines representing the queuing delays in an ideal state free of noise affecting the queuing delays;
  a square error calculation step of calculating square errors between the queuing delay calculated by the packet reception step and the formulae representing the ideal polygonal lines generated by the ideal polygonal line generation step;
  a smallest square error polygonal line determination step of identifying the ideal polygonal line with a smallest one of the square errors calculated by the square error calculation step; and
  an available bandwidth estimated value calculation step of calculating the estimated value of an available bandwidth based on the ideal polygonal line identified by the smallest square error polygonal line determination step.

9. A non-transitory computer readable medium for estimating an available bandwidth of a network connecting between a transmitting device and a receiving device, storing a program for causing a computer to execute a process of:
  a packet reception step of receiving a packet train including a predetermined number of packets with packet sizes incremented by a predetermined increment and transmitted in such a manner that the packets are transmitted at regular intervals, and calculating a queuing delays of the packets in the packet train;
  an ideal polygonal line generation step of generating a formulae representing ideal polygonal lines representing the queuing delays in an ideal state free of noise affecting the queuing delays;
  a square error calculation step of calculating square errors between the queuing delay calculated by the packet reception step and the formulae representing the ideal polygonal lines generated by the ideal polygonal line generation step; and
  a smallest square error polygonal line determination step of identifying the ideal polygonal line with a smallest one of the square errors calculated by the square error calculation step; and
  an available bandwidth estimated value calculation step calculating the estimated value of an available bandwidth on the base of the ideal polygonal line identified by the smallest square error polygonal line determination step.

* * * * *

UNITED STATES PATENT AND TRADEMARK OFFICE
CERTIFICATE OF CORRECTION

| | | |
|---|---|---|
| PATENT NO. | : 9,531,615 B2 | Page 1 of 1 |
| APPLICATION NO. | : 14/416758 | |
| DATED | : December 27, 2016 | |
| INVENTOR(S) | : Takashi Oshiba | |

It is certified that error appears in the above-identified patent and that said Letters Patent is hereby corrected as shown below:

On the Title Page

(22) PCT Filed: Apr. 4, 2013, should appear as follows:
(22) PCT Filed: Apr. 30, 2013

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*